United States Patent
Tanabe

(10) Patent No.: US 9,084,992 B2
(45) Date of Patent: Jul. 21, 2015

(54) PROCESS FOR PRODUCING A NITROGEN-CONTAINING CARBON ALLOY

(71) Applicant: FUJIFILM Corporation, Tokyo (JP)

(72) Inventor: Jun Tanabe, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 155 days.

(21) Appl. No.: 14/061,220

(22) Filed: Oct. 23, 2013

(65) Prior Publication Data

US 2014/0051860 A1    Feb. 20, 2014

Related U.S. Application Data

(62) Division of application No. 13/075,605, filed on Mar. 30, 2011, now abandoned.

(30) Foreign Application Priority Data

Mar. 30, 2010  (JP) ................. 2010-079924

(51) Int. Cl.
| | |
|---|---|
| *B01J 23/745* | (2006.01) |
| *B01J 23/75* | (2006.01) |
| *B01J 27/24* | (2006.01) |
| *B01J 35/10* | (2006.01) |
| *B01J 37/08* | (2006.01) |
| *C01B 31/02* | (2006.01) |
| *H01G 11/34* | (2013.01) |
| *H01G 11/30* | (2013.01) |

(Continued)

(52) U.S. Cl.
CPC ............... *B01J 31/22* (2013.01); *B01J 23/745* (2013.01); *B01J 23/75* (2013.01); *B01J 27/24* (2013.01); *B01J 35/1019* (2013.01); *B01J 37/086* (2013.01); *C01B 31/02* (2013.01); *H01G 11/30* (2013.01); *H01G 11/34* (2013.01); *H01M 4/58* (2013.01); *H01M 4/587* (2013.01); *H01M 4/60* (2013.01); *H01M 4/608* (2013.01); *H01M 4/9008* (2013.01); *H01M 4/9083* (2013.01); *H01M 4/923* (2013.01); *H01M 10/0525* (2013.01); *H01M 12/08* (2013.01); *H01M 2008/1095* (2013.01); *Y02E 60/13* (2013.01); *Y02E 60/50* (2013.01)

(58) Field of Classification Search
None
See application file for complete search history.

(56) References Cited

U.S. PATENT DOCUMENTS

| | | | | |
|---|---|---|---|---|
| 6,228,185 B1 * | 5/2001 | Davies et al. | ................. | 148/437 |
| 2003/0069129 A1 | 4/2003 | Lefebvre | | |

FOREIGN PATENT DOCUMENTS

| | | |
|---|---|---|
| JP | 2004-003043 A | 1/2004 |
| JP | 2004-168587 A | 6/2004 |

(Continued)

OTHER PUBLICATIONS

Pinero et al.; Structural Characterization of N-Containing Activated Carbon Fibers Prepared from a Low Softening Point Petroleum Pitch and a Melamine Resin; Carbon (4), pp. 597-608; 2002.*

(Continued)

*Primary Examiner* — Guinever S Gregorio
(74) *Attorney, Agent, or Firm* — Young & Thompson

(57) ABSTRACT

A nitrogen-containing carbon alloy obtained by baking an organic material having a nitrogen-containing crystalline organic compound having a molecular weight of 60 to 2000, wherein the nitrogen-containing crystalline organic compound excludes a nitrogen-containing metal complex.

2 Claims, 3 Drawing Sheets

1. DCP/CoCl₂·6H₂O         (Example 10)
2. PN/CoCl₂·6H₂O          (Example 14)
3. PR254/Co(NO₃)₂·6H₂O    (Example 24)
4. PR254/FeCl₃·6H₂O       (Example 5)
5. Cl-Ph-CN/FeCl₃·6H₂O/KB (Example 21)
6. PR254/FeCl₂·4H₂O       (Example 8)
7. PR254/FeCl₃            (Example 4)
8. PR202/FeCl₃·6H₂O       (Example 2)
9. Co-Pc                  (Comp. Example 4)

(51) Int. Cl.
  *H01M 4/58*   (2010.01)
  *H01M 4/587*  (2010.01)
  *H01M 4/60*   (2006.01)
  *H01M 4/90*   (2006.01)
  *H01M 4/92*   (2006.01)
  *B01J 31/22*  (2006.01)
  *H01M 10/0525* (2010.01)
  *H01M 12/08*  (2006.01)
  *H01M 8/10*   (2006.01)

(56) References Cited

FOREIGN PATENT DOCUMENTS

| JP | 2004-362802 | | 12/2004 |
| JP | 2006-083012 | | 3/2006 |
| JP | 2006-124250 | | 5/2006 |
| JP | 2007-026746 | | 2/2007 |
| JP | 2007-311026 | | 11/2007 |
| JP | 2009-039623 | | 2/2009 |
| JP | 2009-173627 | | 8/2009 |
| JP | 2009-234918 | | 10/2009 |
| JP | 2010-270107 | | 12/2010 |
| JP | 2011195351 A | * | 10/2011 |

OTHER PUBLICATIONS

Notification of Information Offer issued on May 7, 2014 in the corresponding Japanese Patent Application No. 2011-070943.
Carbon-Nitrogen Pyrolyzates: Attempted Preparation of Carbon Nitride; Communications of the American Ceramic Society; vol. 74, No. 7; Jul. 1991; pp. 1686-1688.
Jun Maruyama et al.—Direct synthesis of a carbonaceous fuel cell catalyst from solid containing small organic molecules and metal salts—Carbon 48 (2010) 3271-3276.
Jun Maruyama et al.—Fuel Cell Cathode Catalyst with Heme-Like Structure Formed for Nitrogen of Glycine and Iron—Journal of the Electrochemical Society, 154 (3) B297-B304 (2007).
Souto et al., Electronic Structure of Nitrogen—Carbon Alloys Determined by Photoelectron Spectroscopy; Physical Review B; vol. 57, No. 4); Jan. 15, 1998.
Xia et al., Synthesis of Ordered Mesoporous Carbon and Nitrogen-Doped Carbon materials with Graphitic Pore Walls Via a Simple Chemical Vapor Deposition Method; Advance Materials; vol. 16, Issue 17, pp. 1553-1558; Sep. 23, 2004.
Tanabe et al.; Carbon Alloys; Carbon ; 38, pp. 329-334; 2000.
JP Office Action dated Jan. 14, 2014, with partial English translation; Application No. 2011-070943.

* cited by examiner

US 9,084,992 B2

PROCESS FOR PRODUCING A NITROGEN-CONTAINING CARBON ALLOY

CROSS-REFERENCE TO RELATED APPLICATION(S)

This application is a division of co-pending application Ser. No. 13/075,605 filed on Mar. 30, 2011, which claims priority from Japanese Patent Application No. 2010-079924 filed on Mar. 30, 2010. The entire content of which is incorporated herein by reference.

BACKGROUND

1. Field

This invention relates to a nitrogen-containing carbon alloy, a process of producing the carbon alloy, and a carbon catalyst containing the carbon alloy. More particularly, it relates to an N-containing carbon alloy obtained from a low-molecular N-containing crystalline organic compound, a process of producing the same, and a carbon catalyst containing the same.

2. Description of the Related Art

Catalysts based on noble metals, such as platinum and palladium, have been applied for their high oxygen reduction activity to, for example, solid polyelectrolyte fuel cells used in automobiles, and domestic power and heat supply systems. However, the noble metal-based catalysts are too costly to be used even more widely.

Research and development have therefore been invested into platinum-free catalysts or catalysts with greatly reduced use of platinum. For example, JP 2007-26746A proposes a catalyst having carbon alloy obtained by baking a polymer resulting from polymerization of a mixture of a precursor of a resin, such as polyfurfuryl alcohol, phenol formaldehyde or melamine resin, and a metal complex, such as cobalt phthalocyanine or iron phthalocyanine. Such a carbon alloy catalyst is known to have high oxygen reduction activity because it is obtained by uniformly dispersing the metal complex in a resin precursor followed by decomposing other than the metal, for example, phthalocyanine moiety so that the metal is uniformly distributed in the catalyst as reported in "Proceedings of the '09 Meeting and Workshop of Fuel Cell-Related Catalyst Division in Catalyst Society of Japan".

JP 2009-173627A describes an electrode catalyst for fuel cells which is obtained by heating a mixture of a metal complex and an organic cyclic compound. JP 2009-234918A discloses a catalyst having a modified metal complex obtained by subjecting a mononuclear-metal complex having an aromatic skeleton to a modification treatment selected from a heat treatment, an irradiation treatment with a radiation, and a discharge treatment.

The problem of these processes is that the polymer material contains low-molecular impurities, such as a solvent, and needs removal of the impurities, which makes the production process complicated. In contrast, processes starting with a low molecular compound are advantageous in that the low molecular compound may previously be purified to provide a high purity precursor. This offers a broader choice of precursor materials.

Carbon alloys prepared from low molecular compounds include those obtained by baking a metal complex and an unsaturated compound as disclosed in JP 2009-39623A and those obtained by baking a metal complex and a polycyclic organic compound having at least two hetero atoms on the same ring as disclosed in JP 2010-270107A. However, metal complexes are difficult to purify, and the unsaturated compound is structurally limited because it must react with the ligand of the metal complex. Due to these problems it is not easy to stably prepare a carbon alloy of high oxygen reduction activity, and the advantage of using a low molecular compound is hardly achieved. "Jun Murayama, *Carbon*, 48, 3271 (2010)" reports preparation of a carbon alloy by baking a mixture of a nitrogen-containing polycyclic organic compound, ferric gluconate, and magnesium acetate, but the oxygen reduction activity of this carbon alloy catalyst is lower than that of the carbon alloys of polymer origin so that it is difficult to eliminate the need to use a noble metal such as platinum or palladium.

On the other hand, metal-free low molecular compounds are free of the problems, such as difficulty of purification and structural limitation. Using a metal-free low molecular compound, nevertheless, poses the following problem. "Jun Murayama and Ikuo Abe, *Journal of the Electrochemical Society*, 154(3), B297 (2007)", for example, reports a case in which a mixture of an amino acid, glucose, and iron lactate is dehydrated and baked. The report reveals that the amino acid alone decomposes at 350° C. and cannot carbonize, indicating the difficulty in carbonizing a metal-free low molecular compound by baking. It has thus been believed by those skilled in the art that a carbon alloy is not obtained from a metal-free low molecular compound.

SUMMARY

An object of the invention is to provide a carbon alloy which has a metal other than noble metals uniformly supported therein and thereby exhibits sufficiently high oxygen reduction activity and which is obtained by baking a low-molecular organic compound that is easy to purify and may have a wide choice of structure; a process of producing the carbon alloy; and a carbon catalyst containing the carbon alloy.

As a result of extensive investigation, the inventors of the present invention have found that an N-containing carbon alloy with sufficiently high oxygen reduction activity is obtainable by baking an organic material having an N-containing crystalline organic compound with a molecular weight of 60 to 2000. They have also found that, when an inorganic metal or an inorganic metal salt is admixed with the N-containing crystalline organic compound, there is obtained an N-containing carbon alloy having the metal uniformly supported therein and exhibiting further increased oxygen reduction activity. The invention has thus been completed based on these findings.

Although a metal-free low molecular compound vaporizes on baking, vaporization of the compound on baking is suppressed by crystallizing the compound to impart increased intermolecular action. By the use of the crystallized compound, carbon alloys having various interstitial structures corresponding to the crystal structure of the crystallized compound can easily be prepared, which allows for controlling the catalyst activity or electric conductivity that is closely related to the interstitial structure.

There is a report that it is desirable to remove a metal oxide and the like from organic materials (see JP-2009-234918). To the contrary, the inventors have ascertained that better effects are obtained when in using an organic material containing at least one of an inorganic metal and an inorganic metal salt. It is considered that, when an N-containing crystalline low molecular compound and an inorganic metal or an inorganic metal salt are used in combination, the metal atoms and nitrogen atoms, which are positioned along the crystal edges with great regularity and uniformity to exert mutual action with each other previously and, as a result, a catalytically-competent nitrogen to metal ratio is achieved spontaneously to provide a carbon alloy having high oxygen reduction activity.

The above objects of the invention are accomplished by the provision of the following subject matter.

<1> A nitrogen-containing carbon alloy obtained by baking an organic material having a nitrogen-containing crystalline organic compound having a molecular weight of 60 to 2000, wherein the nitrogen-containing crystalline organic compound excludes a nitrogen-containing metal complex.

<2> The nitrogen-containing carbon alloy according to <1>, wherein the organic material further has at least one of an inorganic metal and an inorganic metal salt.

<3> The nitrogen-containing carbon alloy according to <1>, wherein the nitrogen-containing crystalline organic compound is a nitrile compound, an amide compound or a quinacridone compound.

<4> The nitrogen-containing carbon alloy according to <1>, wherein the nitrogen-containing crystalline organic compound has at least one group selected from the group consisting of a nitrile group, an amido group and 4-quinolone structure, and an unsaturated bond per molecule.

<5> The nitrogen-containing carbon alloy according to <4>, wherein the nitrogen-containing crystalline organic compound has at least one selected from the group consisting of a nitrile group and an amido group, at least one selected from the group consisting of a nitrile group, an amido group, a halogen atom, and a hydroxyl group, and an unsaturated bond per molecule.

<6> The nitrogen-containing carbon alloy according to <1>, wherein the nitrogen-containing crystalline organic compound is a pigment.

<7> The nitrogen-containing carbon alloy according to <1>, wherein the nitrogen-containing crystalline organic compound has a nitrogen content of 0.1% to 55% by mass.

<8> The nitrogen-containing carbon alloy according to <1>, wherein the organic material is a volatile-retardant compound having a ΔTG value of −95% to −0.1% at 400° C. in a nitrogen atmosphere.

<9> The nitrogen-containing carbon alloy according to <1>, wherein the baking is carried out at a baking temperature of 500° to 1000° C. in a stream of inert gas or non-oxidizing gas.

<10> The nitrogen-containing carbon alloy according to <9>, wherein the inert gas or non-oxidizing gas flows at a flow rate of 0.01 to 2.0 l/min per 36 mm inner diameter.

<11> A process for producing the nitrogen-containing carbon alloy according to <2>, having: mixing the nitrogen-containing crystalline organic compound and the at least one of the inorganic metal and the inorganic metal salt; raising a temperature of the mixture from room temperature to a carbonization temperature of the mixture in an inert atmosphere at a rate of 1° C./min to 1000° C./min; maintaining the mixture at a temperature of 500° to 1000° C. for 0.1 to 100 hours to achieve carbonization; and cooling the carbonized mixture from the carbonization temperature to room temperature.

<12> A carbon catalyst having the nitrogen-containing carbon alloy according to <1>.

<13> A fuel cell having the carbon catalyst according to <12> and a polyelectrolyte.

<14> An electrical storage device having the carbon catalyst according to <12>.

According to the invention, an N-containing carbon alloy having sufficiently high oxygen reduction activity is obtained by baking an organic material containing a low molecular crystalline N-containing organic compound that is easy to purify and may have a wide choice of structure. When an inorganic metal or an inorganic metal salt is admixed with the crystalline N-containing organic compound, there is obtained an N-containing carbon alloy having the metal uniformly supported therein, exhibiting further increased oxygen reduction activity, and having a desired lattice structure. The N-containing carbon alloy is useful as a carbon catalyst. The carbon catalyst is applicable to fuel cells and environmental catalysts. The invention also provides a process for producing the N-containing carbon alloy.

DETAILED DESCRIPTION OF INVENTION

Figure 1:
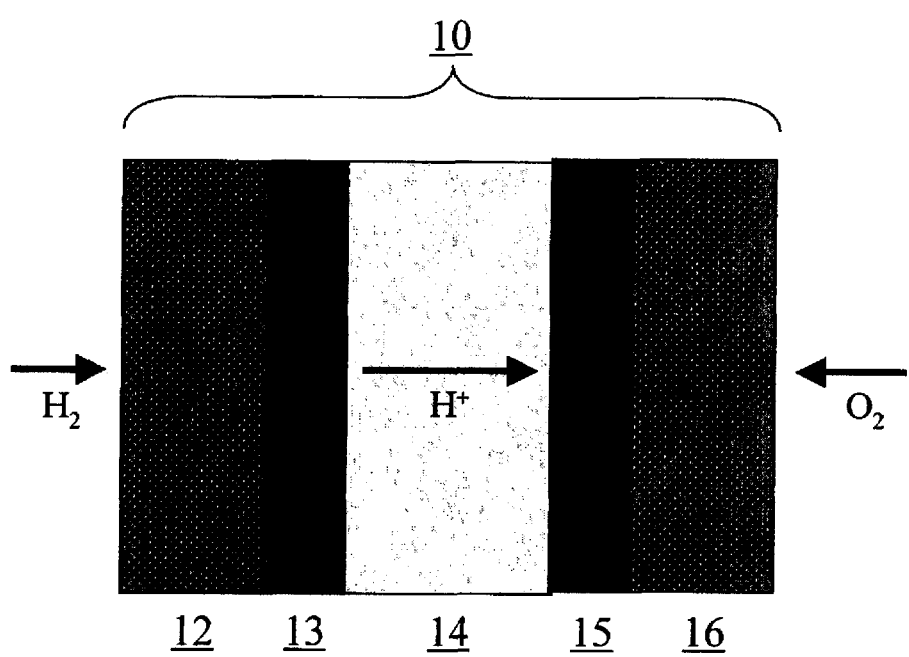
FIG. 1 schematically illustrates a fuel cell having a carbon alloy of the invention.

The term "Hammett constant σp" that will be used in the following description is briefly explained below. The Hammett's rule is an empirical rule proposed by L. P. Hammett in 1935 in an attempt to quantitatively discuss the influences of a substituent of a benzene derivative on the reaction or equilibrium, the validity of which is now generally admitted. Substituent constants obtained by the Hammett's rule include σp and σm values. These values are found in many general books, for example, J. A. Dean (ed.), *Lange's Handbook of Chemistry*, the 12th Ed., MacGraw-Hill (1979) and *Kagakuno Ryoiki*, Extra Ed., No. 122, pp. 96-103, Nankodo (1979). In the following description, various substituents will be limited or described in terms of Hammett constants σp. This does not mean that intended substituents are limited to those substituents the σp value of which is known from literature, and intended substituents include any substituent of which the σp value is not found in literature but seems to fall within a recited range when determined based on Hammett's rule. While the pigments represented by formulae (1) and (2) that will be described later for use in the invention are not benzene derivatives, the electronic effect of their substituent will be represented by the measure σp irrespective of the position of the substituent. Note that the σp values will be used in that sense hereinafter.

As used herein, the term "substituent" means any atom or group of atomics capable of substitution. Examples of the substituent include halogen atoms (e.g., fluorine, chlorine, bromine, and iodine), a hydroxyl group, a cyano group, aliphatic groups (e.g., aralkyl, cycloalkyl, and active methine), an aryl group (which may be bonded at any position thereof), a heterocyclic group (which may be bonded at any position thereof), an acyl group, aliphatic oxy groups (e.g., alkoxy, alkyleneoxy, or a group having repeated ethyleneoxy or propyleneoxy units), an aryloxy group, a heterocyclic oxy group, an aliphatic carbonyl group, an arylcarbonyl group, a heterocyclic carbonyl group, an aliphatic oxycarbonyl group, an aryloxycarbonyl group, a heterocyclic oxycarbonyl group, a carbamoyl group, a sulfonylcarbamoyl group, an acylcarbamoyl group, a sulfamoylcarbamoyl group, a thiocarbamoyl group, an aliphatic carbonyloxy group, an aryloxycarbonyloxy group, a heterocyclic carbonyloxy group, an amino group, an aliphatic amino group, an arylamino group, a heterocyclic amino group, an acylamino group, an aliphatic oxyamino group, an aryloxyamino group, a sulfamoylamino group, an acylsulfamoylamino group, an oxamoylamino group, an aliphatic oxycarbonylamino group, an aryloxycarbonylamino group, a heterocyclic oxycarbonylamino group, a carbamoylamino group, a mercapto group, an aliphatic thio group, an arylthio group, a heterocyclic thio group, an alkylsulfinyl group, an arylsulfinyl group, an aliphatic sulfonyl group, an arylsulfonyl group, a heterocyclic sulfonyl group, an aliphatic sulfonylureido group, an arylsulfonylureido group, a heterocyclic sulfonylureido group, an aliphatic sulfonyloxy group, an arylsulfonyloxy group, a heterocyclic sulfonyloxy group, a sulfamoyl group, an aliphatic sulfamoyl group, an arylsulfamoyl group, a heterocyclic sulfamoyl group, an acylsulfamoyl group, a sulfonylsulfamoyl group or a salt thereof, a carbamoylsulfamoyl group, a sulfonamido group, an aliphatic ureido group, an arylureido group, a heterocyclic ureido group, an aliphatic sulfonamido group, an arylsulfonamido group, a heterocyclic sulfonamido group, an aliphatic sulfinyl group, an arylsulfinyl group, a nitro group, a nitroso group, a diazo group, an azo group, a hydrazino group, a di-aliphatic oxyphosphinyl group, a diaryloxyphosphinyl group, silyl groups (e.g., trimethylsilyl, t-butyldimethylsilyl, and phenyldimethylsilyl), silyloxy groups (e.g., trimethylsilyloxy and t-butyldimethylsilyloxy), a borono group, and ionic hydrophilic groups (e.g., carboxyl, sulfo, phosphono, and quaternary ammonium group). These substituents may further have a substituent selected, for example, from the substituents recited above.

(I) N-Containing Carbon Alloy

The N-containing carbon alloy of the invention is obtained by baking an organic material containing an N-containing crystalline organic compound having a molecular weight of 60 to 2000.

[Nitrogen-Containing Crystalline Organic Compound]

As used herein, the term "N-containing crystalline organic compound" means a compound having crystallinity and containing nitrogen and includes hydrocarbon compounds with a carbon atom of the hydrocarbon structure replaced with a hetero atom, such as oxygen, nitrogen, or sulfur, and hydrocarbon compounds with a hydrogen atom of the hydrocarbon structure replaced with a functional group containing a hetero atom, such as oxygen, nitrogen, or sulfur. The N-containing crystalline organic compound should have crystallinity so that the molecules of the compound may be regularly oriented with ease. It should be noted, however, that N-containing metal complexes are excluded from the N-containing crystalline organic compound because, for one thing, they are difficult to purify and, for another, the N-containing ligand to metal complex ratio is fixed so that, when they decompose on baking, the decomposition rate of the N-containing ligand and the vaporization rate of the coordinated metal complex cannot be controlled, presenting difficulties in obtaining an intended N-containing carbon alloy. Even when an N-containing metal complex and a low molecular organic compound are mixed, the N-containing metal complex crystals decompose, and the metal is directly subjected to reduction. As a result, neighboring metal atoms thus produced are liable to agglomerate and crystallize. Because the metal is removed by acid cleaning, the resulting N-containing carbon alloy is non-uniform only to have reduced functionality. For use as, for example, a catalyst, the resulting N-containing carbon alloy will have reduced catalyst activity. For these reasons, N-containing metal complexes are not suited for use in the invention.

[Crystal Structure]

The N-containing crystalline organic compound that can be used in the invention is selected with considerations given to π-π interaction, coordinate bond, charge transfer interaction, and hydrogen bond. It is preferred that the N-containing crystalline organic compound have a crystal structure formed by at least two bonds or interactions. By the use of a low molecular compound having such a crystal structure, the intermolecular interaction is enhanced, thereby allowing for control on vaporization during baking in the preparation of an N-containing carbon alloy.

As used herein, the term "crystal structure" refers to the arrangement or alignment of molecules within a crystal. In other words, a crystal structure is composed of repeated unit cells. Molecules are located at any position and oriented in the unit cell and oriented. Molecules assume uniform conformation in a crystal. That is, because the functional group is uniformly arranged in a crystal, the intermolecular interaction is equal in and out of the unit cell. In the case of, for instance, an N-containing crystalline organic compound having a stacking structure, an interaction is exerted between aromatic rings, heterocyclic rings, fused polycyclic structures, fused polyheterocyclic structures, or unsaturated groups (e.g., C≡N, vinyl, allyl, or acetylene). For example, aromatic rings arranged face to face exert π-π interaction (often referred to as π-π stacking). The molecules pile up at regular interval by the intermolecular overlapping of the sp2 or sp orbitals of carbon atoms of unsaturated bond in these rings or groups thereby to form stacked columnar assemblies.

The columnar assemblies have a uniform structure, in which adjacent columns are arranged with a specific intermolecular distance by hydrogen bonds or van der Waals forces. This is advantageous in that heat transfer within crystals is easily accomplished.

The N-containing crystalline organic compound used in the invention is a low molecular compound and yet has crystallinity and exhibits heat resistance due to vibration relaxation by phonons (quantized lattice vibration). Therefore, the decomposition temperature is maintained to the carbonization temperature so that carbonization is accomplished with reduced vaporization of decomposition products to form a carbon alloy structure.

A noncrystalline compound is unfavorable because molecular orientation is uncontrollable during baking only to provide a non-uniform structural carbon material.

It is preferred that the N-containing crystalline organic compound have a melting temperature of 25° C. or higher. If the melting temperature is lower than 25° C., there will not be an air layer during baking, which contributes to heat resistance, and the compound will boil or bump based on the temperature vs. vapor pressure relation, resulting in a failure to obtain a carbon material.

The N-containing crystalline organic compound for used in the invention is not particularly limited as long as it is a crystalline organic compound containing a nitrogen atom and having a molecular weight of 60 to 2000. The molecular weight of the N-containing crystalline organic compound is preferably 100 to 1500, more preferably 130 to 1000.

The N-containing crystalline organic compound preferably has at least one functional group selected from, for example, the above mentioned group of substituents and/or a heterocyclic group. In particular, the N-containing crystalline organic compound preferably has at least one functional group selected from halogen (e.g., chlorine, chlorine, bromine, or iodine), hydroxyl, cyano, aliphatic carbonyl, arylcarbonyl, heterocyclic carbonyl, aliphatic oxycarbonyl, aryloxycarbonyl, heterocyclic oxycarbonyl, aliphatic amino, arylamino, heterocyclic amino, acylamino, aliphatic oxyamino, aryloxyamino, sulfamoylamino, acylsulfamoylamino, oxamoylamino, aliphatic oxycarbonylamino, aryloxycarbonylamino, heterocyclic oxycarbonylamino, and carbamoylamino. Examples of the N-containing crystalline organic compound include amines, imines, nitriles, imides, and amides. Nitrile compounds, amide compounds and quinacridone compounds are preferred in terms of crystallinity and heat resistance, and nitrile compounds and amide compounds are more preferred.

The N-containing crystalline organic compound is preferably an organic compound having an unsaturated bond and at least one group selected from the group consisting of a nitrile group, an amido group and 4-quinolone structure in the molecule thereof, more preferably an organic compound having at least one group selected from a nitrile group and an amido group and an unsaturated bond in the molecule thereof, further more preferably an organic compound having at least one group selected from a nitrile group and an amido group, at least one group selected from a nitrile group, an amido group, a halogen atom, and a hydroxyl group, and an unsaturated bond in the molecule thereof, still further more preferably an organic compound having at least one group selected from a nitrile group and an amido group, at least one group selected from a nitrile group, an amido group, and a halogen atom, and an unsaturated bond in the molecule thereof.

It is believed that starting with an N-containing crystalline organic compound having a nitrile group or an amido group in its molecule results on baking in the formation of active sites composed of C, N, and metal atoms having high oxygen reduction activity in the resulting N-containing carbon alloy.

It is preferred for the N-containing crystalline organic compound to have an aromatic ring formed by unsaturated bonds. The aromatic ring is preferably a heterocyclic ring having one hetero atom or a benzene ring, with a substituted or unsubstituted benzene ring and a substituted or unsubstituted pyridine ring being particularly preferred. The presence of the unsaturated bonds is considered to induce the above described interaction to form a carbon alloy skeleton.

When the molecules of the N-containing crystalline organic compound have, for example, nitrogen (N) of an amido, amine, or nitrile group, a hetero atom of a hetero ring (e.g., N of a pyridyl group), a chalcogen element (e.g., O, S, or Se) of a carbonyl, ether, or hydroxyl group), or a halogen element (e.g., F, Cl, Br, or I) between adjacent stacked columns, these atoms form hydrogen bonds with protons ($H^+$). Thus, the assembly of the stacked columns may be controlled by at least one interaction, such as hydrogen bonds, coordinate bonds, charge transfer interaction, acid-base interaction, and van der Waals interaction, or by multiple interaction exerted two-dimensionally or three-dimensionally in the network.

The N-containing crystalline organic compounds may be used either individually or as a mixture of two or more thereof. The N-containing crystalline organic compound preferably has a metal content of not more than 10 ppm. The N-containing crystalline organic compound with the above recited molecular weight is easy to purify before baking.

The nitrogen content of the N-containing crystalline organic compound is preferably 0.1% to 55%, more preferably 1% to 30%, even more preferably 4% to 20%, by mass. When in using the N-containing crystalline organic compound with the nitrogen content in that range, there is no need to separately introduce a nitrogen-containing compound as a nitrogen source, and nitrogen atoms and metal atoms are regularly and uniformly arranged along the crystal edges and allowed to show interaction with each other easily. As a result, a nitrogen to metal ratio exhibiting higher oxygen reduction activity will be obtained.

The N-containing crystalline organic compound is preferably a volatile-retardant compound having a ΔTG value of −95% to −0.1%, more preferably −95% to −1%, even more preferably −90% to −5%, at 400° C. in a nitrogen atmosphere. As will be described in detail, the N-containing crystalline organic compound may be mixed with an inorganic metal or an inorganic metal salt as long as the N-containing crystalline organic compound is capable of carbonization without vaporization during baking.

The term "ΔTG" or "ΔTG value" as used herein denotes a percent mass loss of the organic material, i.e., the N-containing crystalline organic compound or a mixture of the N-containing crystalline organic compound and an inorganic metal or inorganic metal salt, at 400° C. relative to the mass at room temperature (30° C.) measured by TG-DTA analysis in which the compound or the mixture is heated from 30° C. to 1000° C. at a rate of temperature rise of 10° C./min, under flowing nitrogen. The volatile-retardant N-containing crystalline organic compound having the ΔTG value falling within the range recited is prevented from decomposing during baking, which affords an increased carbon yield.

The N-containing heterocyclic compounds include N-containing heterocyclic monocyclic compounds and N-containing fused heterocyclic compounds. Suitable N-containing heterocyclic monocyclic compounds include 5-membered ring compounds, such as pyrrole and its derivatives, diazole compounds (e.g., pyrazole and imidazole) and their derivatives, and triazole compounds and their derivatives; and 6-membered ring compounds, such as pyridine and its derivatives, diazine compounds (e.g., pyridazine, pyrimidine, and pyrazine) and their derivatives, and triazine compounds and their derivatives (e.g., melamine or cyanuric acid). Suitable N-containing fused heterocyclic compounds include quinoline, phenanthroline, and purine.

Examples of the amines include primary, secondary, and tertiary amines, diamines, triamines, polyamines, and amino compounds. The primary to tertiary amines include aliphatic amines, such as methylamine, ethylamine, dimethylamine, and trimethylamine, and aromatic amines (e.g., aniline) and derivatives thereof. The diamines are exemplified by ethylenediamine. The amino compounds include amino alcohols exemplified by ethanolamine. Examples of the imines include pyrrolidine and ethyleneimine Examples of the nitriles include aliphatic nitriles, such as acetonitrile; aromatic nitriles and halides thereof, such as benzonitrile, phthalonitrile, isophthalonitrile, terephthalonitrile, and tetracyanobenzene; isonitrile; and amino acids. Examples of the amides include carboxylic acid amides, N-substituted amides, (N-mono- and disubstituted amides), aromatic amides (aromatic mono- and diamides), urea, carbamide, urethane, lactam, lactim, hydrazide, imidic acid, and imidic esters.

The N-containing heterocyclic compound is preferably a pigment. Pigments form uniform stacked columnar assemblies via intermolecular π-π interaction, with the adjacent columns arranged with a specific intermolecular distance by hydrogen bonds or van der Waals forces. Therefore, heat transfer within crystals is easily accomplished. Although the pigments are low molecular compounds, they have crystallinity and exhibit heat resistance due to vibration relaxation by phonons (quantized lattice vibration). Therefore, the decomposition temperature is maintained to the carbonization temperature so that carbonization is accomplished with reduced vaporization of decomposition products.

Preferred pigments are isoindoline pigments, isoindolinone pigments, diketopyrrolopyrrole pigments, quinacridone pigments, oxazine pigments, phthalocyanine pigments, quinophthalone pigments, latent pigments derived from the above described pigments (described hereinafter), and lake pigments obtained by combining dyes with a metal ion, with diketopyrrolopyrrole pigments, quinacridone pigments, isoindoline pigments, isoindolinone pigments, quinophthalone pigments, latent pigments derived from these pigments being more preferred. On baking, the pigment decomposes to form a benzonitrile (Ph-CN) structure, which acts as a reaction active species to provide a carbon alloy catalyst with higher oxygen reduction reaction (ORR) activity. When a metal species (M) is present in the system, the pigment forms a Ph-CN . . . M complex on baking to provide a carbon alloy with still higher ORR activity.

The N-containing crystalline organic compounds include a compound represented by formula (1) shown below, a tautomer thereof, or a salt or a hydrate of the compound of formula (1) and the tautomer.

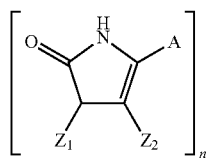
(1)

In the formula (1), each of $Z_1$ and $Z_2$ independently represents a hydrogen atom, an aliphatic group, an aryl group, a heterocyclic group, an acyl group, a hydroxyl group, an aliphatic oxycarbonyl group, a carbamoyl group (—$CONH_2$), or a sulfonyl group; n represents an integer 1 to 3; when n=2, the compound is a dimer formed via $Z_1$ and $Z_2$, and when n=3, the compound is a trimer formed via a benzene or triazine ring containing $Z_1$ and $Z_2$; and A represents any one of the following formulae (A-1) to (A-39).

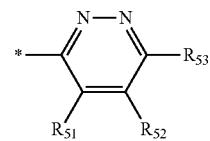
(A-1)

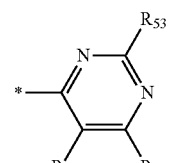
(A-2)

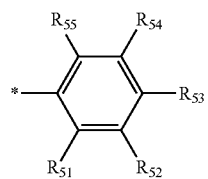
(A-3)

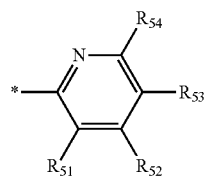
(A-4)

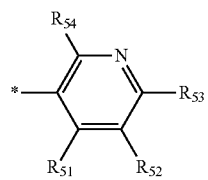
(A-5)

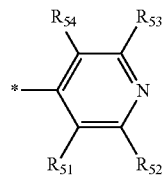
(A-6)

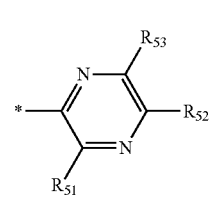
(A-7)

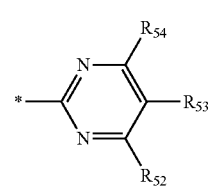
(A-8)

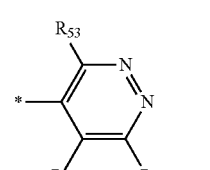
(A-9)

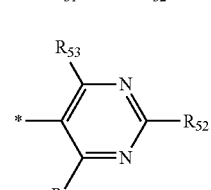
(A-10)

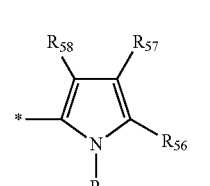
(A-11)

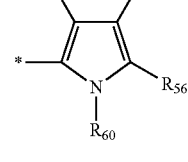
(A-12)

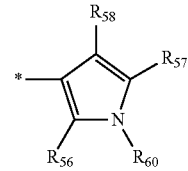
(A-13)

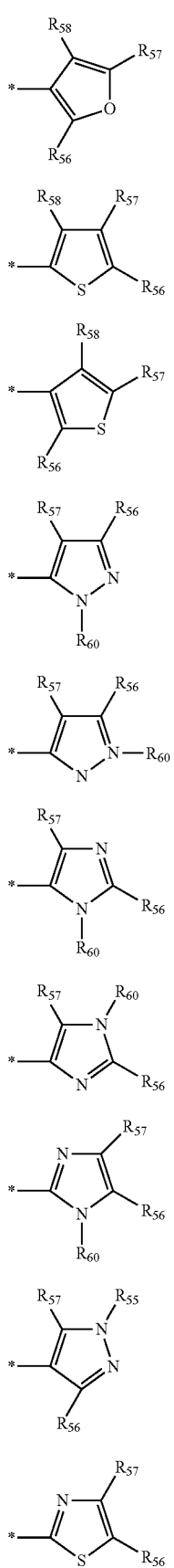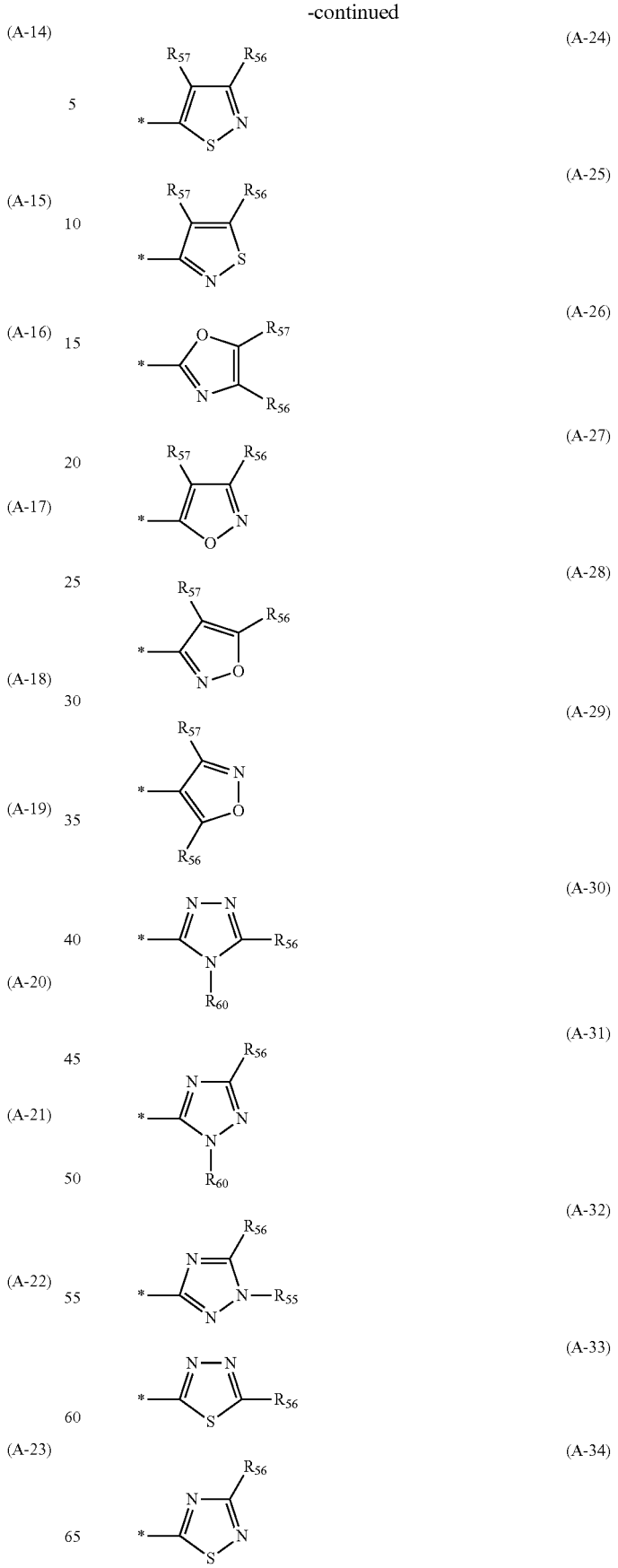

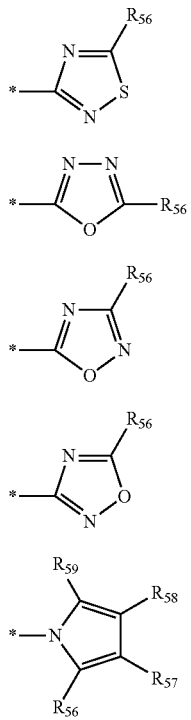

In the formulae (A-1) to (A-39), each of $R_{51}$, $R_{52}$, $R_{53}$, $R_{54}$, $R_{55}$, $R_{56}$, $R_{57}$, $R_{58}$, $R_{59}$, and $R_{60}$ independently represent hydrogen or a substituent; adjacent substituents may be connected to each other to form a 5- or 6-membered ring; and the asterisk mark * indicates the position of the bond to the pyrrolidone structures.

The aliphatic group as represented by $Z_1$ and $Z_2$ may be substituted or unsubstituted and saturated or unsaturated. The substituent the aliphatic group may have may be any one of those which are listed above and able to substitute for hydrogen of the aliphatic group. The aliphatic group is preferably an alkyl group having 1 to 8 carbon atoms, more preferably alkyl having 1 to 6 carbon atoms, e.g., methyl, ethyl, isopropyl, cyclohexyl, or t-butyl.

The aryl group as represented by $Z_1$ and $Z_2$ may be optionally substituted. The substituent the aryl group may have may be any one of those which are listed above and able to substitute for hydrogen on the aryl group. The aryl group is preferably an aryl group having 6 to 12 carbon atoms, more preferably an aryl group having 6 to 10 carbon atoms, such as phenyl, 3-methoxyphenyl, or 4-carbamoylphenyl.

The heterocyclic group as represented by $Z_1$ and $Z_2$ may be optionally substituted, saturated or unsaturated, and monocyclic or a fused ring system. The substituent the heterocyclic group may have may be any one of those which are listed above and able to substitute for hydrogen of the heterocyclic group. The heterocyclic group is preferably a heterocyclic group having 2 to 16 carbon atoms, more preferably a 5- or 6-membered heterocyclic group having 2 to 12 carbon atoms, such as 1-pyrrolidinyl, 4-morpholinyl, 2-pyridyl, 1-pyrrolyl, 1-imidazolyl, or 1-benzimidazolyl.

The aliphatic oxycarbonyl group as represented by $Z_1$ and $Z_2$ may be optionally substituted and saturated or unsaturated. The substituent the aliphatic oxycarbonyl group may have may be any one of those which are listed above and able to substitute for hydrogen of the aliphatic oxycarbonyl group. The aliphatic oxycarbonyl group is preferably an alkoxycarbonyl group having 1 to 8 carbon atoms, more preferably an alkoxycarbonyl group having 1 to 6 carbon atoms, such as methoxycarbonyl, ethoxycarbonyl, isopropoxycarbonyl, or carbamoylmethoxycarbonyl.

The carbamoyl group as represented by $Z_1$ and $Z_2$ may be optionally substituted. The substituent the carbamoyl group may have may be any one of those which are listed above and able to substitute for hydrogen of the carbamoyl group and is preferably an aliphatic group, an aryl group, or a heterocyclic group. The optionally substituted carbamoyl group is preferably a carbamoyl group, an alkylcarbamoyl group having 2 to 9 carbon atoms, a dialkylcarbamoyl group having 3 to 10 carbon atoms, an arylcarbamoyl group having 7 to 13 carbon atoms, or a heterocyclic carbamoyl group having 3 to 12 carbon atoms, more preferably a carbamoyl group, an alkylcarbamoyl group having 2 to 7 carbon atoms, a dialkylcarbamoyl group having 3 to 6 carbon atoms, an arylcarbamoyl group having 7 to 11 carbon atoms, or a heterocyclic carbamoyl group having 3 to 10 carbon atoms, such as carbamoyl, methylcarbamoyl, dimethylcarbamoyl, phenylcarbamoyl, or 4-pyridinecarbamoyl.

The sulfamoyl group as represented by $Z_1$ and $Z_2$ may be substituted or unsubstituted. The substituent the sulfamoyl group may have may be any one of those which are listed above and able to substitute for hydrogen of the sulfamoyl group and is preferably an aliphatic group, an aryl group, or a heterocyclic group. The optionally substituted sulfamoyl group is preferably a sulfamoyl group, an alkylsulfamoyl group having 1 to 9 carbon atoms, a dialkylsulfamoyl group having 2 to 10 carbon atoms, an arylsulfamoyl group having 7 to 13 carbon atoms, or a heterocyclic sulfamoyl group having 2 to 12 carbon atoms, more preferably a sulfamoyl group, an alkylsulfamoyl group having 1 to 7 carbon atoms, a dialkylsulfamoyl group having 3 to 6 carbon atoms, an arylsulfamoyl group having 6 to 11 carbon atoms, or a heterocyclic sulfamoyl group having 2 to 10 carbon atoms, such as sulfamoyl, methylsulfamoyl, N,N-dimethylsulfamoyl, phenylsulfamoyl, or 4-pyridinesulfamoyl.

$Z_1$ and $Z_2$ may be connected to each other to form a 5- or 6-membered ring. Examples of the ring formed by $Z_1$ and $Z_2$ include benzene, pyridine, pyrazine, pyrimidine, triazine, pyridazine, pyrrole, pyrazole, imidazole, triazole, oxazole, oxadiazole, thiazole, thiadiazole, furan, thiophene, selenophene, silole, germole, phosphole, and pyrrolidone rings, with pyrrolidone, benzene, pyridine, pyrazine, pyrimidine, triazine, pyridazine, pyrrole, pyrazole, imidazole, and triazole rings being preferred, and with a pyrrolidone ring being more preferred.

The substituent as $R_{51}$ to $R_{60}$ may be any of those listed above and able to substitute for hydrogen as $R_{51}$ to $R_{60}$. Suitable substituents as $R_{51}$ to $R_{59}$ are halogen (e.g., fluorine, chlorine, bromine, or iodine), aliphatic, aryl, heterocyclic, hydroxyl, acyl, aliphatic oxycarbonyl, optionally substituted carbamoyl, acylamino, sulfonamido, aliphatic oxy, aliphatic thio, cyano, or sulfonyl, preferably halogen (e.g., fluorine, chlorine, bromine, or iodine), aliphatic, aryl, heterocyclic, hydroxyl, aliphatic oxycarbonyl, optionally substituted carbamoyl, optionally substituted ureido, aliphatic oxy, or cyano.

From the viewpoint of effects of the invention, each of $R_{51}$ to $R_{59}$ is preferably hydrogen, halogen (e.g., fluorine, chlorine, bromine, or iodine), aliphatic, aryl, heterocyclic, hydroxyl, acyl, aliphatic oxycarbonyl, optionally substituted carbamoyl, optionally substituted ureido, acylamino, sulfonamido, aliphatic oxy, aliphatic thio, cyano, or sulfonyl, more preferably hydrogen, halogen (e.g., fluorine, chlorine, bromine, or iodine), aliphatic, aliphatic oxycarbonyl, optionally substituted carbamoyl, optionally substituted ureido, aliphatic oxy, or cyano.

The substituent as $R_{60}$ may be any of those listed above and able to substitute for hydrogen as $R_{60}$. Preferred substituents as $R_{60}$ are an aliphatic group, an aryl group, a heterocyclic group, and an aromatic 5- or 6-membered heterocyclic ring formed through $R_{60}$ and the substituent $R_{51}$ to $R_{59}$ adjacent to $R_{60}$, with an aliphatic group, an aryl group, a 5- or 6-membered aromatic heterocyclic group having nitrogen at an ortho position relative to the position of the bond, and an aromatic 5- or 6-membered heterocyclic ring formed through $R_{60}$ and the substituent $R_{51}$ to $R_{59}$ adjacent to $R_{60}$ being more preferred.

In terms of the effects of the invention, $R_{60}$ is preferably an aliphatic group, an aryl group, or a heterocyclic group, more preferably an aliphatic group, an aryl group, a 5- or 6-membered aromatic heterocyclic group having nitrogen at an ortho position relative to the position of the bond, or an aromatic 5- or 6-membered heterocyclic ring formed through $R_{60}$ and the substituent $R_{51}$ to $R_{59}$ adjacent to $R_{60}$, even more preferably a 5- or 6-membered aromatic heterocyclic group having nitrogen at an ortho position relative to the position of the bond or an aromatic 5- or 6-membered heterocyclic ring formed through $R_{60}$ and the substituent $R_{51}$ to $R_{59}$ adjacent to $R_{60}$. When $R_{60}$ is a 5- or 6-membered aromatic heterocyclic group having nitrogen at an ortho position relative to the position of the bond, not only intermolecular π-π interaction but intramolecular interaction by hydrogen bonding are exerted to readily impart heat resistance. When an aromatic 5- or 6-membered heterocyclic ring formed through $R_{60}$ and the substituent $R_{51}$ to $R_{59}$ adjacent to $R_{60}$ is included, not only heat resistance is imparted by the intermolecular π-π interaction, but also nitrogen doping into graphene of carbon alloy is easily achieved, thereby to provide excellent ORR activity.

The substituents as $R_{52}$, $R_{53}$, and $R_{54}$ may be any one of those listed above and able to substitute for hydrogen on the ring. In terms of the effects of the invention, each of $R_{52}$ to $R_{54}$ is preferably a heterocyclic group or an electron withdrawing group having a Hammett constant σp of 0.20 or greater, more preferably an electron withdrawing group having a Hammett constant σp of 0.30 or greater. The upper limit of the σp value is 1.0.

Examples of the electron withdrawing group with a σp value of 0.20 or greater as $R_{52}$ to $R_{54}$ are an acyl group, an acyloxy group, a carbamoyl group, an alkyloxycarbonyl group, an aryloxycarbonyl group, a cyano group, a nitro group, a dialkylphosphono group, a diarylphosphono group, a diarylphosphinyl group, an alkylsulfinyl group, an arylsulfinyl group, an alkylsulfonyl group, an arylsulfonyl group, a sulfonyloxy group, an acylthio group, a sulfamoyl group, a thiocyanate group, a thiocarbonyl group, a haloalkyl group, a haloalkoxy group, a haloaryloxy group, a haloalkylamino group, a haloalkylthio group, an aryl substituted with another electron withdrawing group having a σp value of 0.20 or greater, a heterocyclic group, a halogen group, an azo group, and a selenocyanate group.

In the formula (1), A is preferably any one of (A-1) to (A-16) and (A-39), more preferably any one of (A-1) to (A-4), (A-6) to (A-8), (A-10), and (A-39).

On decomposing the compound of formula (1), a CN bond is formed in the decomposition product because of the cyclic structure (A-1) to (A-39). The CN bond and a metal interact with each other, whereby nitrogen is retained until carbonization. As a result, nitrogen is easily introduced into the graphene layers of carbon alloy to impart excellent ORR activity. In particular, it is preferred to use a pigment having such a structural characteristic.

Of the heterocyclic structures (A-2) to (A-39), the N-containing structures (A-2) to (A-4), (A-6) to (A-8), (A-10), and (A-39) are preferred because nitrogen atoms in the hetero ring will regularly align along crystal edges originating from the N-containing crystalline organic compound to allow free metal ions to coordinate therewith.

The N-containing crystalline organic compound of the formula (1) is preferably represented by formula (2).

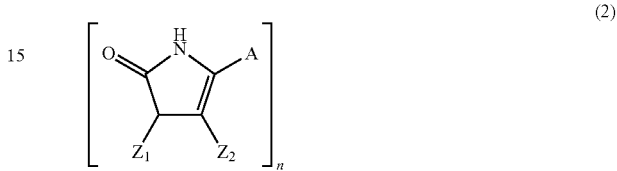

In the formula (2), each of $Z_1$ and $Z_2$ independently represent a hydrogen atom, an aliphatic group, an aryl group, a heterocyclic group, an acyl group, a hydroxyl group, an aliphatic oxycarbonyl group, a carbamoyl group (—$CONH_2$), or a sulfonyl group; n represents an integer 1 to 3; when n=2, the compound is a C2 symmetric dimer formed via $Z_1$ and $Z_2$, and when n=3, the compound is a C3 symmetric trimer formed via a benzene ring containing $Z_1$ and $Z_2$.

The preferred types and scopes of $Z_1$, $Z_2$, A, and n in formula (2) are the same as in formula (1).

The N-containing crystalline organic compound of the formula (2) is preferably represented by formula (3).

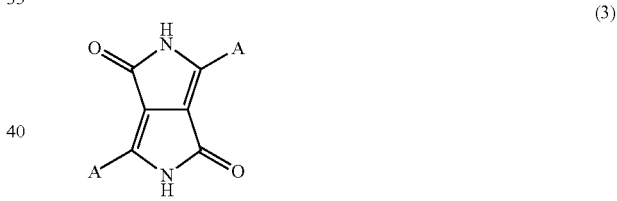

In the formula (3), A represents any one of (A-1) to (A-39). The asterisk mark * indicates the position of the bond to A in the formula (3).

The preferred types and scopes of A in the formula (3) are the same as in the formula (1).

The N-containing crystalline organic compound of the formula (1) is preferably represented by the formula (4).

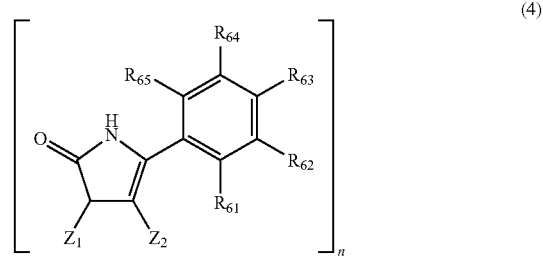

In the formula (4), each of $Z_1$ and $Z_2$ independently represents a hydrogen atom, an aliphatic group, an aryl group, a heterocyclic group, an acyl group, a hydroxyl group, an aliphatic oxycarbonyl group, a carbamoyl group (—CONH$_2$), or a sulfonyl group; n represents an integer 1 to 3; when n=2, the compound is a C2 symmetric dimer formed via $Z_1$ and $Z_2$, and when n=3, the compound is a C3 symmetric trimer formed via a benzene ring containing $Z_1$ and $Z_2$; and $R_{61}$, $R_{62}$, $R_{63}$, $R_{64}$, and $R_{65}$ each represent a hydrogen atom or a substituent; and adjacent substituents may be connected to each other to form a 5- or 6-membered ring.

The preferred types and scopes of $R_{61}$ to $R_{65}$ are the same as those of $R_{51}$ to $R_{55}$ in formula (1).

The N-containing crystalline organic compound of the formula (3) or (4) is preferably represented by formula (5).

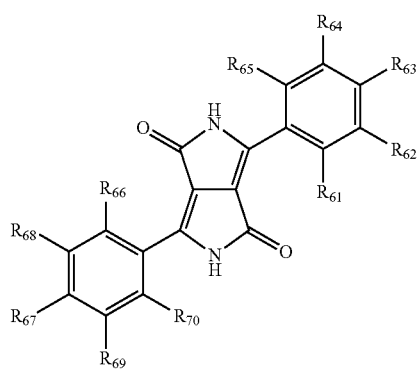

(5)

In the formula (5), each of $R_{61}$, $R_{62}$, $R_{63}$, $R_{64}$, $R_{65}$, $R_{66}$, $R_{67}$, $R_{68}$, $R_{69}$, and $R_{70}$ independently represents a hydrogen atom or a substituent, and adjacent two of the substituents $R_{61}$ to $R_{70}$ may be connected to each other to form a 5- or 6-membered ring.

The preferred types and scopes of $R_{61}$ to $R_{70}$ in the formula (5) are the same as those of $R_{51}$ to $R_{55}$ in the formula (1).

The specific examples of the compound represented by the formula (1) are shown below, but the invention is not restricted to these compounds.

In the following specific examples, Me stands for a methyl group, Bu stands for a butyl group, and Ph stands for a phenyl group.

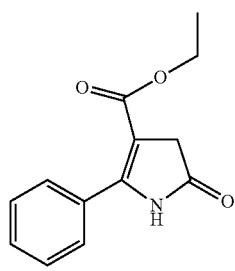

(6)

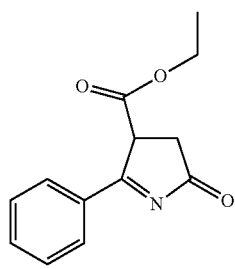

(7)

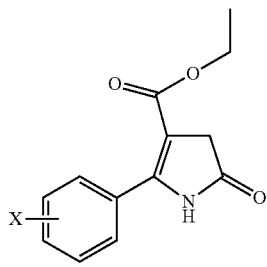

(8)

X = Cl, Br, I, OMe

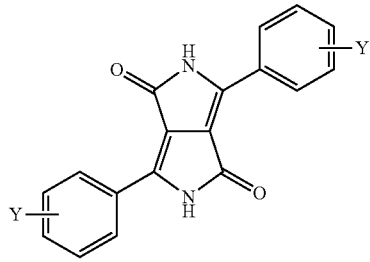

(9)

Y = H, Cl, Br, OMe, CN, Ph, Me, t-Bu

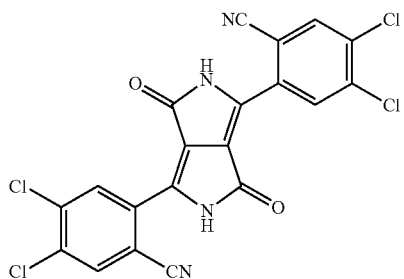

(10)

The pigment that can be used in the invention is not structurally limited and may be any of magenta, yellow, and cyan pigments. Suitable organic pigments include perylene pigments, perynone pigments, quinacridone pigments, quinacridonequinone pigments, anthraquinone pigments, anthanthrone pigments, benzimidazolone pigments, disazo condensation pigments, disazo pigments, azo pigments, indanthrone pigments, indanthrene pigments, quinophthalone pigments, quinoxalinedione pigments, metal-free phthalocyanine pigments, triarylcarbonium pigments, dioxazine pigments, aminoanthraquinone pigments, diketopyrrolopyrrole pigments, naphthol AS pigments, thioindigo pigments, isoindoline pigments, isoindolinone pigments, pyranthrone pigments, isobioranthrone pigments, mixtures of these pigments, latent pigments derived from these pigments, mixtures of the latent pigments, and mixtures of the latent pigments and the above described pigments.

Examples of suitable pigments include perylene pigments, such as C.I. Pigment Red 190 (PR190, C.I. No. 71140), C.I. Pigment Red 224 (PR224, C.I. No. 71127), and C.I. Pigment Violet 29 (PV29, C.I. No. 71129); perynone pigments, such as C.I. Pigment Orange 43 (PO43, C.I. No. 71105) and C.I. Pigment Red 194 (PR 194, C.I. No. 71100); quinacridone pigments, such as C.I. Pigment Violet 19 (PV19, C.I. No. 73900), C.I. Pigment Violet 42 (PV42), C.I. Pigment Red 122 (PR122, C.I. No. 73915), C.I. Pigment Red 192 (PR192, C.I. No. 739155), C.I. Pigment Red 202 (PR202, C.I. No. 73907), C.I. Pigment Red 207 (PR207, C.I. No. 73900, 73906), and C.I. Pigment Red 209 (PR209, C.I. No. 73905); quinacridonequinone pigments, such as C.I. Pigment Red 206 (PR206, C.I. No. 73900/73920), C.I. Pigment Orange 48 (PO48, C.I. No. 73900/73920), and C.I. Pigment Orange 49 (PO49, C.I. No. 73900/73920); anthraquinone pigments, such as C.I. Pigment yellow 147 (PY147, C.I. No. 60645); anthanthrone pigments, such as C.I. Pigment Red 168 (PR168, C.I. No. 59300); benzimidazolone pigments, such as C.I. Pigment Brown 25 (PB25, C.I. No. 12510), C.I. Pigment Violet 32 (PV32, C.I. No. 12517), C.I. Pigment Yellow 180 (PY180, C.I. No. 21290), C.I. Pigment yellow 181 (PY181, C.I. No. 11777), C.I. Pigment Orange 62 (PO62, C.I. No. 11775), and C.I. Pigment Red 185 (PR185, C.I. No. 12516); disazo condensation pigments, such as C.I. Pigment Yellow 93 (PY93, C.I. No. 20710), C.I. Pigment yellow 94 (PY94, C.I. No. 20038), C.I. Pigment Yellow 95 (PY95, C.I. No. 20034), C.I. Pigment yellow 128 (PY128, C.I. No. 20037), C.I. Pigment Yellow 166 (PY166, C.I. No. 20035), C.I. Pigment Orange 34 (PO34, C.I. No. 21115), C.I. Pigment Orange 13 (PO13, C.I. No. 21110), C.I. Pigment Orange 31 (PO31, C.I. No. 20050), C.I. Pigment Red 144 (PR144, C.I. No. 20735), C.I. Pigment Red 166 (PR166, C.I. No. 20730), C.I. Pigment Red 220 (PR220, C.I. No. 20055), C.I. Pigment Red 221 (PR221, C.I. No. 20065), C.I. Pigment Red 242 (PR242, C.I. No. 20067), C.I. Pigment Red 248 (PR248), C.I. Pigment Red 262 (PR262), and C.I. Pigment Brown 23 (PB23, C.I. No. 20060); disazo pigments, such as C.I. Pigment yellow 13 (PY13, C.I. No. 21100), C.I. Pigment Yellow 83 (PY83, C.I. No. 21108), and C.I. Pigment Yellow 188 (PY188, C.I. No. 21094); azo pigments, such as C.I. Pigment Red 187 (PR187, C.I. No. 12486), C.I. Pigment Red 170 (PR170, C.I. No. 12475), and C.I. Pigment Yellow 74 (PY74, C.I. No. 11714); indanthrone pigments, such as C.I. Pigment Blue 60 (PB60, C.I. No. 69800); quinophthalone pigments, such as C.I. Pigment Yellow 138 (PY138, C.I. No. 56300); phthalocyanine pigments, such as C.I. Pigment Green 7 (PG7, C.I. No. 74260), C.I. Pigment Green 36 (PG36, C.I. No. 74265), and Pigment Blue 16 (PB16, C.I. No. 74100); dioxazine pigments, such as C.I. Pigment Violet 23 (PV23, C.I. No. 51319) and C.I. Pigment Violet 37 (PV37, C.I. No. 51345); aminoanthraquinone pigments, such as C.I. Pigment Red 177 (PR177, C.I. No. 65300); diketopyrrolopyrrole pigments, such as C.I. Pigment Red 254 (PR254, C.I. No. 56110), C.I. Pigment Red 255 (PR255, C.I. No. 561050), C.I. Pigment Red 264 (PR264, C.I. No. 561300), C.I. Pigment Red 272 (PR272, C.I. No. 561150), C.I. Pigment Orange 71 (PO71, C.I. No. 561200), and C.I. Pigment Orange 73 (PO73); thioindigo pigments, such as C.I. Pigment Red 88 (PR88, C.I. No. 73312); isoindoline pigments, such as C.I. Pigment Yellow 139 (PY139, C.I. No. 56298), C.I. Pigment Yellow 185 (PY185, C.I. No. 12516), C.I. Pigment Orange 66 (PO66, C.I. No. 48210), and C.I. Pigment Orange 69 (PO69, C.I. No. 56292); isoindolinone pigments, such as C.I. Pigment Yellow 109 (PY109, C.I. No. 56284), C.I. Pigment Yellow 110 (PY110, C.I. No. 56280), C.I. Pigment Yellow 137 (PY137, C.I. No. 561600), and C.I. Pigment Orange 61 (PO61, C.I. No. 11295); pyranthrone pigments, such as C.I. Pigment Orange 40 (PO40, C.I. No. 59700) and C.I. Pigment Red 216 (PO216, C.I. No. 59710); and isobioranthrone pigments, such as C.I. Pigment Violet 31 (PV31, C.I. No. 60010). Preferred of them are quinacridone pigments, diketopyrrolopyrrole pigments, isoindoline pigments, quinophthalone pigments, and latent pigments derived from these pigments. Particularly preferred pigments are diketopyrrolopyrrole pigments, such as C.I. Pigment Red 254 (PR54, C.I. No. 56110), C.I. Pigment Red 255 (PR255, C.I. No. 561050), C.I. Pigment Red 264 (PR264, C.I. No. 561300), C.I. Pigment Red 272 (PR272, C.I. No. 561150), C.I. Pigment Orange 71 (PO71, C.I. No. 561200), and C.I. Pigment Orange 73 (PO73); quinacridone pigments, such as C.I. Pigment Violet 19 (PV19, C.I. No. 73900), C.I. Pigment Violet 42 (PC42), C.I. Pigment Red 122 (PR122, C.I. No. 73915), C.I. Pigment Red 192 (PR192, C.I. No. 739155), C.I. Pigment Red 202 (PR202, C.I. No. 73907), C.I. Pigment Red 207 (PR207, C.I. No. 73900, 73906), and C.I. Pigment Red 209 (PR209, C.I. No. 73905); isoindoline pigments, such as C.I. Pigment Yellow 139 (PY139, C.I. No. 56298), C.I. Pigment Yellow 185 (PY185, C.I. No. 12516), C.I. Pigment Orange 66 (PO66, C.I. No. 48210), C.I. Pigment Orange 69 (PO69, C.I. No. 56292); isoindolinone pigments, such as C.I. Pigment Yellow 109 (PY109, C.I. No. 56284), C.I. Pigment Yellow 110 (PY110, C.I. No. 56280), C.I. Pigment Yellow 137 (PY137, C.I. No. 561600), and C.I. Pigment Orange 61 (PO61, C.I. No. 11295); and quinophthalone pigments, such as C.I. Pigment Yellow 138 (PY138, C.I. No. 56300).

Latent pigments derived from the above described pigments are also useful. The latent pigments may be used individually or as a mixture of two or more thereof or in combination with the pigments.

As used herein, the term "latent pigment" is intended to mean a compound having a thermally decomposable group and capable of being easily converted to an organic pigment by applying energy such as heat. The latent pigment is exemplified by a pigment compound having introduced to the pigment base thereof a protective group enhancing solvent solubility. The protective group is easily released by, for example, chemical, photolytic, or thermal treatment, whereby the latent pigment is converted to an insoluble pigment having its essential color. For the details of latent pigments, reference may be made to Nature, vol. 388, p. 131 (1997). Examples of suitable latent pigments with various colors and structures are given, e.g., in JP 9-3362A, WO 98/32802, WO 98/45757, WO 98/58027, WO 99/01511, JP 11-92695A, and JP 11-310726A.

Latent pigments that are preferably used in the invention are compound described in the paragraph [0066] and [Chemical formulae 21 to 27] in JP 2010-83982A. Commercially available latent pigments may be used as well. Particularly preferred latent pigments are PR 254-LP and PR 122-LP shown below.

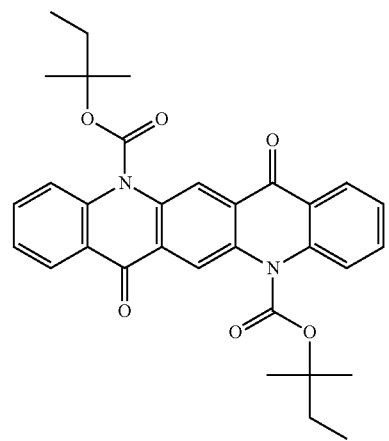

PR 122-LP

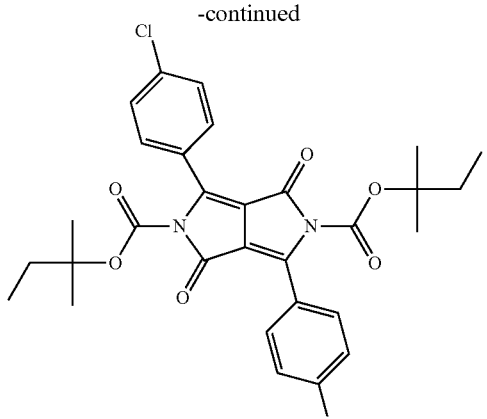

PR 254-LP

The N-containing crystalline organic compounds also include a compound represented by formula (11) shown below, a tautomer thereof, or a salt or a hydrate of the compound of the formula (11) and the tautomer.

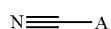 (11)

In the formula (11), A represents any one of the formulae (A-1) to (A-39), in which adjacent two of the substituents $R_{51}$ to $R_{60}$ may be connected to each other to from a 5- or 6-membered ring or a heterocyclic fused ring system, and the asterisk mark * indicates the position of the bond to the nitrile structure in the formula (11).

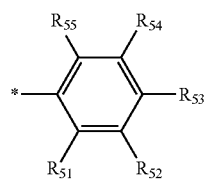 (A-1)

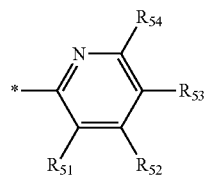 (A-2)

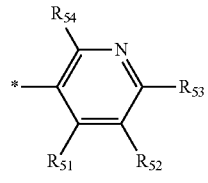 (A-3)

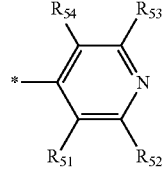 (A-4)

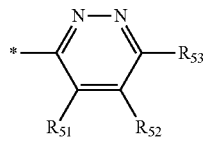 (A-5)

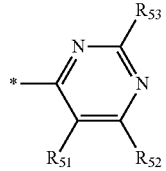 (A-6)

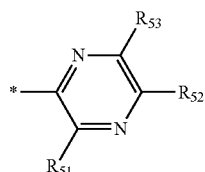 (A-7)

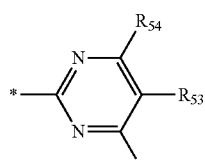 (A-8)

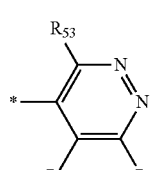 (A-9)

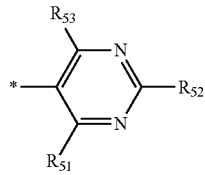 (A-10)

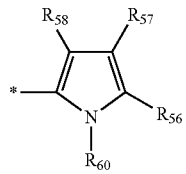 (A-11)

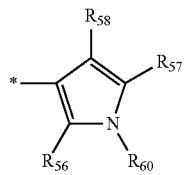 (A-12)

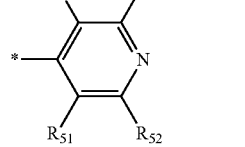 (A-13)

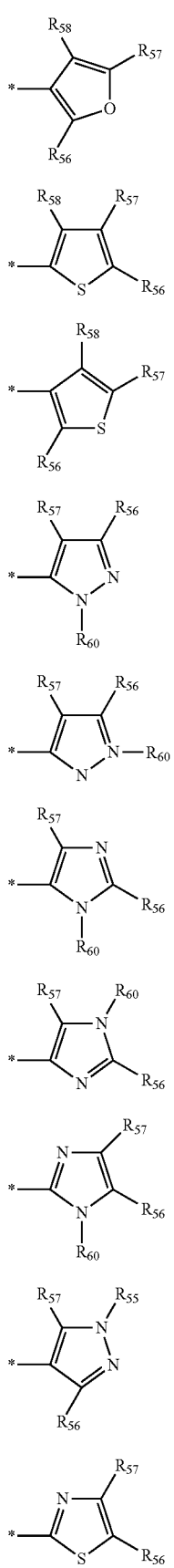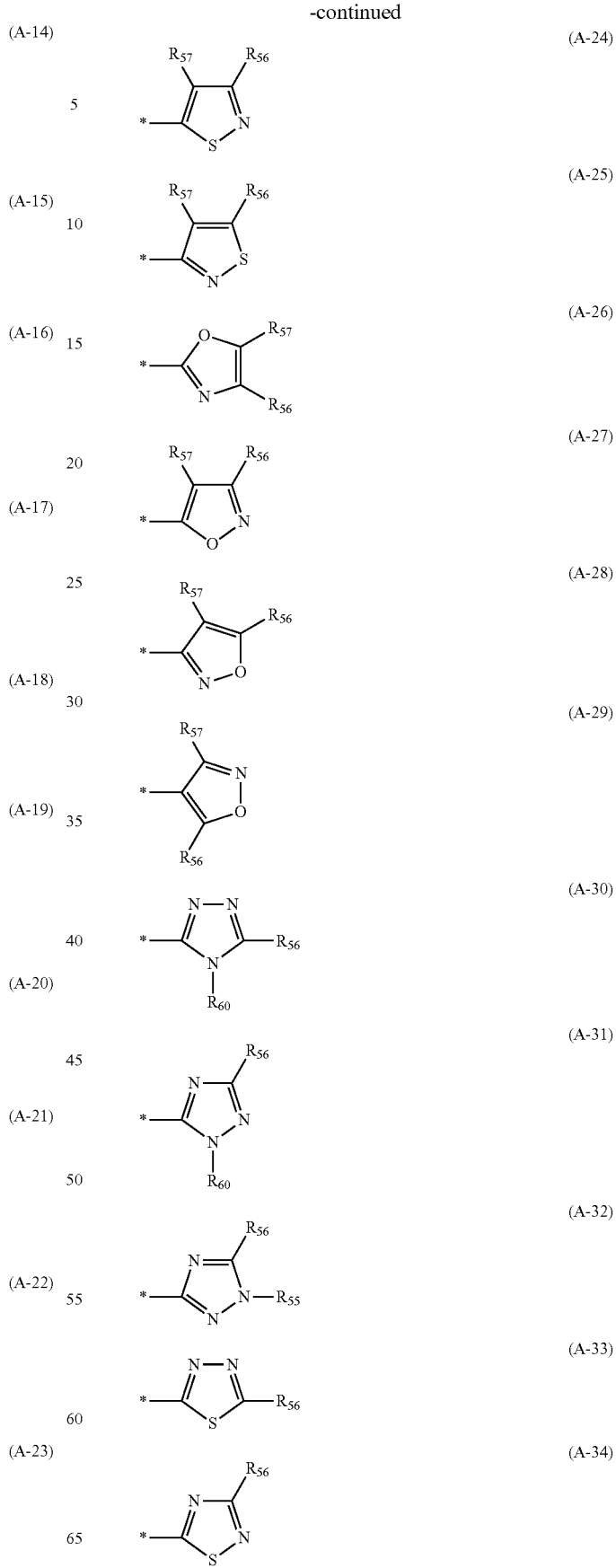

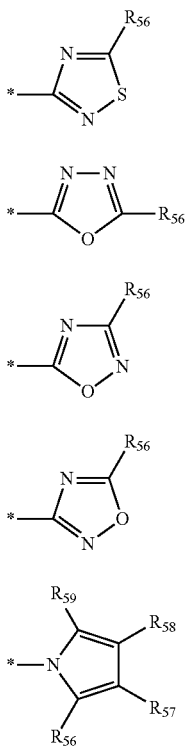

(A-35)

(A-36)

(A-37)

(A-38)

(A-39)

Preferred types and scopes of the substituents in the cyclic structures (A-1) to (A-39) are the same as for those in the formula (1).

Of the compounds of the formula (11), preferred are those represented by formulae (13) to (18). In the following specific examples, Ph represents a phenyl group, t-Bu represents a tert-butyl group.

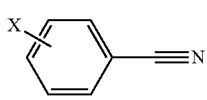

(13)

X = Cl, Br, I, OMe, OH, CN, Ph, Me, t-Bu, CONH$_2$

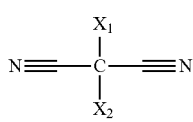

(14)

$X_1, X_2$ = H, Cl, Br, I, OMe, OH, CN, Ph, Me, t-Bu, CONH$_2$

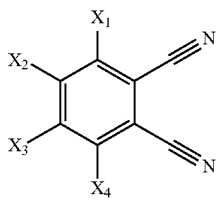

(15)

$X_1$-$X_4$ = H, Cl, Br, I, OMe, OH, CN, Ph, Me, t-Bu, CONH$_2$, NH$_2$

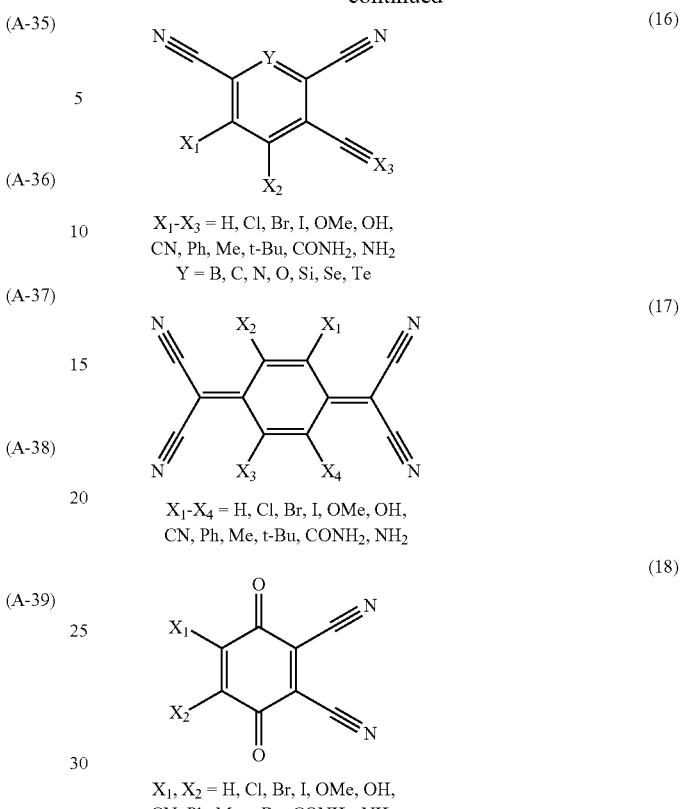

(16)

$X_1$-$X_3$ = H, Cl, Br, I, OMe, OH, CN, Ph, Me, t-Bu, CONH$_2$, NH$_2$
Y = B, C, N, O, Si, Se, Te (17)

$X_1$-$X_4$ = H, Cl, Br, I, OMe, OH, CN, Ph, Me, t-Bu, CONH$_2$, NH$_2$ (18)

$X_1, X_2$ = H, Cl, Br, I, OMe, OH, CN, Ph, Me, t-Bu, CONH$_2$, NH$_2$

[Inorganic Metal and Inorganic Metal Salt]

The organic material preferably contains at least one member selected from an inorganic metal and an inorganic metal salt in addition to the N-containing crystalline organic compound. In this preferred embodiment, there can be obtained a carbon alloy exhibiting higher oxygen reduction activity by the interaction between nitrogen and metal atoms. That is, the N-containing crystalline organic compound decomposes on baking, and the decomposition product forms an N-containing carbon alloy catalyst in a vapor phase. When metal exists in the vapor phase, the decomposition product interacts with the metal to form a complex. The resulting N-containing carbon alloy catalyst thus shows improved activity.

The carbon alloy takes the form of fine carbon particles at least part of which preferably have a turbostratic structure, such as a nanoshell structure.

It is more preferred that the carbon alloy of the present embodiment contains a transition metal or a transition metal compound. In the more preferred embodiment, the carbon alloy is produced by carbonizing the N-containing crystalline organic compound, which contains nitrogen atoms (N) as a constituent element. It is preferred that, on baking the N-containing crystalline organic compound, the nitrogen atoms be immobilized on the surface of the carbon alloy at high concentration by the catalytic action of the transition metal or transition metal compound added to the N-containing crystalline organic compound, thereby forming carbon particles having the nitrogen atoms and the transition metal or transition metal compound mutually acting on each other.

The carbon alloy of the present embodiment exhibits high activity presumably for the following reason. The N-containing crystalline organic compound has a uniform structure in which molecules are stacked into columnar structures by the intermolecular pi-pi interaction, and the adjacent columns are arranged with a specific intermolecular distance by hydrogen bonds or van der Waals forces. The N-containing crystalline organic compound decomposes and/or vaporizes on heating. Because of being uniform and crystalline, the compound exhibits excellent heat transfer. As a result, a high concentration of reaction sites is provided, and carbon crystals form at many points. In some cases, interaction occurs with the transition metal or transition metal compound to catalytically promote carbonization. Therefore, a basic structure of a carbon alloy is generally a stack of graphene layers made of sp2-bonded carbon atoms packed in a two-dimensionally extending honeycomb lattice.

The carbon alloy of the present embodiment is considered to be characterized by extremely large number of edge planes.

The N-containing crystalline organic compound is not particularly limited in shape as long as the carbon catalyst activity will be shown. For example, it may be spherical or have a largely distorted shape, such as elliptic, flattened, or angular. The form of the N-containing crystalline organic compound may be sheet-like, fibrous, columnar, or particulate.

The metal of at least one of the inorganic metal and the inorganic metal salt is not particularly limited as long as the carbon catalyst activity is not hindered. Usable metals include di- to tetra-valent typical metals, transition metals, and inner transition metals. Examples of the typical metals are Al, Si, Ga, Ge, As, In, Sn, Sb, Tl, and Pb. Examples of the transition metals include Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, and Hg. Examples of the inner transition metals include lanthanides and actinides, e.g., Ce, Pr, Nd, Pm, Sm, Eu, Gd, Tb, Dy, Ho, Er, Tm, Yb, Lu, Th, Pa, U, Np, and Am.

Preferred of them are transition metals, particularly those belonging to the fourth period of Groups 3 to 12 of the Periodic Table, such as Co, Fe, Mn, Ni, Cu, Ti, V, Cr, Zn, Zr, Nb, Mo, Ta, and Ce, with Co, Fe, Mn, Ni, Cr, Cu, and Ce being especially preferred. Co, Fe, Mn) Ni, Cr, Cu, and Ce, and compounds thereof (such as salts thereof) are competent to form a nanoshell structure that improves the carbon catalyst activity. Of them, Co and Fe are particularly superior in forming a nanoshell structure. Furthermore, Co or Fe incorporated into the carbon catalyst is able to enhance the oxygen reduction activity of the carbon alloy catalyst. The most preferred transition metal is Co because a Co-containing N-containing carbon alloy is superior in storage stability owing to its non-susceptibility to functional deterioration due to oxidation with time.

The carbon alloy may contain one or more element(s) other than the transition metals, such as boron, alkali metals (e.g., Na, K, and Cs), alkaline earth metals (e.g., Mg, Ca, and Ba), Pb, Sn, In, and Tl.

The inorganic metal salts include, but are not limited to, hydroxides, oxides, nitrides, sulfates, sulfites, sulfides, sulfonates, carbonylates, nitrates, nitrites, and halides, with those having, as a counter ion, a halide ion, a nitrate ion, or a sulfate ion being preferred. The metal halide, nitrate, or sulfate having a halide, nitrate, or sulfate counter ion easily allows the metal element to bond to the surface carbon appearing on thermal decomposition to increase the specific surface area.

The inorganic metal salt may contain crystallization water. The presence of crystallization water of the inorganic metal salt provides improved thermal conductivity, allowing for uniform baking. Examples of suitable inorganic metal salts containing crystallization water are cobalt chloride hydrates, iron (III) chloride hydrates, and iron (II) chloride hydrates.

The N-containing carbon alloy of the invention is preferably obtained by baking an organic material containing 55 to 99.999 parts by mass of the N-containing crystalline organic compound and 0.001 to 45 parts by mass of at least one of an inorganic metal and an inorganic metal salt, more preferably an organic material containing 60 to 99.9 parts by mass of the N-containing crystalline organic compound and 0.1 to 40 parts by mass of at least one of an inorganic metal, and an inorganic metal salt, even more preferably an organic material containing 70 to 99 parts by mass of the N-containing crystalline organic compound and 1 to 30 parts by mass of at least one of an inorganic metal, and an inorganic metal salt, each per 100 parts by mass of the total of the N-containing crystalline organic compound and the inorganic metal and/or the inorganic metal salt.

The organic material having the above described preferred composition provides a carbon alloy with high ORR activity. When the content of the N-containing crystalline organic compound in the organic material is less than 55 parts, there are some cases in which metal atoms vaporized from an inorganic metal or an inorganic salt gather to form clusters, which further congregate into metal particles. This is because the ratio of the N-containing crystalline organic compound to the inorganic metal or inorganic metal salt is so small that the inorganic metal or inorganic metal salt are not liable to interact with the decomposition product of the N-containing crystalline organic compound.

Metal particles of single nanometer size partly contribute to the ORR activity whereas those exceeding several tens of nanometer take no part in the ORR activity.

While, at this time, the mechanism of the ORR activity is not entirely clear, the following assumption can be made. The organic material forms catalytically active sites (metal coordination sites or spaces formed of or by at least C, N, and a metal ion) on carbonization, so that oxygen is adsorbed by and coordinated to the active sites of the catalyst and then reduced.

If large metal particles are formed in the step of baking, the precipitated metal particles will be removed by acid cleaning after grinding. That is, catalytically active sites (metal coordination sites or spaces), by and to which oxygen is to be adsorbed and coordinated, are not formed, resulting in a failure to exhibit sufficient ORR activity.

On the other hand, when a metal source and the N-containing crystalline organic compound are mixed in a ratio within the recited range, a sufficient amount of the N-containing crystalline organic compound exists around the individual metal species to prevent the metal atoms from associating into clusters. Therefore, an N-containing carbon alloy forms on baking the N-containing crystalline organic compound, and the metal mildly coordinates to the N-containing carbon alloy along the edges (where activity will develop) generated both inside and outside the resulting graphite to form catalytically active sites. The N-containing carbon alloy thus exercises its ORR activity sufficiently.

The ORR activity may be represented by current density measured by the method described in Examples hereinafter given. To attain a high output, the current density during oxygen reduction is preferably as lois possible. Specifically, the current density is preferably $-100$ $\mu A/cm^2$ or less, more preferably $-300$ $\mu A/cm^2$ or less, even more preferably $-1100$ $\mu A/cm^2$.

The present embodiment is advantageous in that there is no need to uniformly disperse the N-containing crystalline organic compound and the inorganic metal or inorganic metal salt in the preparation of the organic material to be baked. The mixed state of the N-containing crystalline organic compound and the inorganic metal or inorganic metal salt at room temperature is not influential on the ORR activity of the resulting carbon alloy because what is necessary to form active species having ORR activity is believed to be that the decomposition product of the N-containing crystalline organic compound and vapor of the inorganic metal salt, etc. should be in contact with each other during baking.

The inorganic metal or inorganic metal salt preferably has a diameter of 0.001 to 100 μm, more preferably 0.01 to 10 μm. The metallic particles within that size range are able to be uniformly admixed with the N-containing crystalline organic compound so that the N-containing crystalline organic compound may easily form a complex on decomposition. The inorganic metal particles may have the surface thereof oxidized so long as an inorganic metal is reproduced during baking.

The following combinations are exemplified as preferred embodiments of the present invention.

Preferred combinations of the metal of at least one of the inorganic metal and the inorganic metal salt and the N-containing crystalline organic compound include a combination of iron, cobalt, iron salt, or cobalt salt and a nitrile compound, an amide compound, or a quinacridone compound. A more preferred combination is cobalt, or cobalt salt and an organic compound having at least one of a nitrile group, an amido group, and 4-quinolone structure and an unsaturated bond per molecule. An even more preferred combination is cobalt and an organic compound having at least one of a nitrile group and an amido group, at least one of a nitrile group, an amido group, a halogen atom, and a hydroxyl group and an unsaturated bond in the molecule thereof.

[Carbon Alloy]

The carbon alloy of the invention, which is obtained by baking the above described organic material, is an N-containing carbon alloy having nitrogen doped therein. The carbon alloy of the invention has a stack of graphene layers made of sp2-bonded carbon atoms packed in a two-dimensional honeycomb lattice. The carbon alloys having nitrogen atoms doped into the honeycomb lattice are divided according to the binding form of nitrogen atom into the following types (i) through (iv).

(i) Oxide type ($N_{OX}$): A nitrogen atom binding to halogen, oxygen, and so on in an oxidized state.
(ii) Graphitic type ($N_Q$): A nitrogen atom substituting for one of the carbon atoms on the boundary between adjacent hexagons of a graphene layer.
(iii) Pyrrolic type ($N_5$): A nitrogen atom present in an N-containing pentagon, a result of change from a hexagon of a graphene layer.
(iv) Pyridinic type ($N_6$): A nitrogen atom substituting for one carbon atom that is not on the border between adjacent hexagons of a graphene layer, the carbon atom mostly being on the edge periphery of a graphene layer
(v) Pyridonic type ($N_6^*$): A nitrogen atom binding to two carbon atoms to make a hexagon, with one of the carbon atoms having OH or O bonded thereto.

The surface nitrogen content and the surface carbon content of the carbon catalyst are determined by X-ray photoelectron spectroscopy (XPS). The $N_{1s}$ XPS spectrum shows peaks at different binding energies assigned to the difference of the above defined types of nitrogen atoms. With this feature taken advantage of, the peaks are separated to compare the intensities, thereby to obtain the N to C ratio. Typical positions of the peaks of the nitrogen atoms of the types described are shown below.

(i) $N_{OX}$: 402.9±0.2 eV
(ii) $N_Q$: 401.2±0.2 eV
(iii) $N_5$: 400.5±0.2 eV
(iv) $N_6$: 398.5±0.2 eV As stated, there can be pyridonic nitrogen ($N_6^*$) atoms binding to carbon atoms having an OH group. However, $N_6^*$ nitrogen is not distinguishable from pyrrolic nitrogen ($N_5$) because it has an intensity peak at the same binding energy as that of pyrrolic nitrogen ($N_5$) (400.5±0.2 eV) (see E. Raymundo-Pinero et al., *Carbon*, vol. 40, pp. 597-608 (2002)). Therefore, in the description of the invention, $N_6^*$ nitrogen atoms are described as being included in "$N_5$ nitrogen atoms". Suitability of a nitrogen atom for binding to metal is dependent on whether the nitrogen atom has an isolated electron pair. A nitrogen atom having an isolated electron pair donates the electron pair to the unoccupied orbital of a metal ion to form a coordinate bond. Of the nitrogen atom types discussed above, $N_5$ and $N_6$ nitrogen atoms having an isolated electron pair are effective in binding to metal, whereas the $N_{OX}$ and $N_Q$ nitrogen atoms are not effective. Accordingly, the ratio of the sum of the number of $N_5$ nitrogen atoms and the number of $N_6$ nitrogen atoms to the total number of nitrogen atoms as obtained by peak separation of the $N_{1s}$ XPS spectrum, $\{(N_5+N_6)/N\}$, is preferably 0.2 to 1.0, more preferably 0.3 to 1.0. When $\{(N_5+N_6)/N\}$ is smaller than 0.2, the number of nitrogen atoms capable of binding to metal may be insufficient, which can result in a failure to obtain sufficient oxygen reduction catalytic characteristics. The upper limit of $\{(N_5+N_6)/N\}$ is, in principle, 1.

It is more preferred that the carbon alloy catalyst have a surface nitrogen content to surface carbon content ratio, N/C, of 0.05 to 0.3. When the N to C atomic ratio, N/C, is less than 0.05, the number of nitrogen atoms capable of binding to metal may be insufficient, which can result in a failure to obtain sufficient oxygen reduction catalyzing characteristics. When the N/C exceeds 0.3, the carbon skeleton of the carbon alloy has reduced strength and reduced electrical conductivity.

The carbon alloy should be composed of at least carbon atoms and nitrogen atoms and may contain other atoms, such as hydrogen and oxygen. In the latter case, the atomic ratio of the other atoms to the sum of carbon atoms and nitrogen atoms, other atoms/(C+N), is preferably 0.3 or smaller.

The specific surface area of the carbon alloy may be determined by the BET method as follows. A carbon alloy sample is put in a prescribed container and cooled to the liquid nitrogen temperature (−196° C.). Nitrogen gas is introduced into the container to be adsorbed by the carbon alloy. An adsorption isotherm is prepared, from which a monomolecular adsorption and an adsorption parameter are calculated. The specific surface area of the sample is obtained from the results and the known molecular area of nitrogen (0.162 $cm^2$).

The specific surface area, average pore size, and pore volume of the carbon alloy may be determined by the following procedures. A carbon alloy sample is put in a prescribed container and cooled to the liquid nitrogen temperature (−196° C.). Nitrogen gas is introduced into the container, and the adsorbed nitrogen quantity is obtained by a volumetric method or a gravimetric method. The pressure of nitrogen gas introduced is gradually increased, and the adsorbed gas quantity is plotted against each equilibrium pressure to obtain a nitrogen adsorption isotherm. The specific surface area, average pore size, and pore volume are calculated using the adsorption isotherm in accordance with the subtracting pore effect (SPE) method (K. Kaneko, et al., *Carbon*, 30, 1075 (1986)). The SPE method is a method to calculate specific surface area and others by performing micropore analysis with the use of the $\alpha_s$-plot method, the t-plot method or the like and eliminating the effect of strong potential field of micropores. The SPE method achieves higher accuracy than the BET method in calculating the specific surface area and the like of a microporous sample.

The pore geometry of the carbon alloy is not particularly limited. The pores may be only on the surface or not only on the surface but also inside of the carbon alloy. In the latter case, the carbon alloy may have pores passing through the carbon alloy like tunnels or may have spherical or polyhedral (e.g., hexagonal columnar) voids connected to each other.

The specific surface area of the carbon alloy is preferably 30 m$^2$/g or more, more preferably 35 m$^2$/g or more, even more preferably 40 m$^2$/g or more. When the specific surface area is less than 30 m$^2$/g, the area capable of being in contact with a substance to be supported and the number of pores capable of containing the substance are reduced, thereby, it may be insufficient to exhibit sufficient oxygen reduction catalytic characteristics. When the carbon alloy has catalytically active sites (metal coordination sites or spaces formed of or by at least C, N, and a metal ion) at a high density, the specific surface area may be less than 30 m$^2$/g. It should be noted that, with a specific surface area of 1000 m$^2$/g or more, oxygen may fail to reach the deepest part of the pores, which can result in insufficient oxygen reduction catalytic characteristics.

The average pore size of the carbon alloy is preferably 1 to 50 nm, more preferably 2 to 10 nm. When the average pore size is smaller than 1 nm, the pores are often smaller than a component to be supported, which can result in a failure to obtain sufficient ORR catalytic characteristics. When the average pore size is greater than 50 nm, the specific surface area tends to be insufficient to exhibit sufficient ORR catalytic characteristics.

The pore volume of the carbon alloy is not particularly limited; for it varies with the specific surface area and the average pore size. Usually, the pore volume is preferably 0.1 to 50 mug, more preferably 0.2 to 2.5 ml/g.

The form and shape of the carbon alloy are not particularly limited as long as ORR activity is exhibited. The carbon alloy may be sheet-like, fibrous, block-like, columnar, or particulate and may have a spherical shape or a largely distorted shape, such as elliptic, flattened, or angular. Block-like or particulate forms are preferred in terms of dispersibility.

The carbon alloy of the invention may be dispersed in a solvent (disperse medium) to make a slurry. The slurry may be applied to a substrate, baked, and dried to make a carbon catalyst of desired shape. By the use of the slurry, a carbon catalyst is produced with improved processability, which facilitates making an electrode catalyst of fuel cells or an electrode material of electrical storage devices.

The solvent is chosen appropriately from those commonly employed in the production of electrode catalysts of fuel cells or electrode materials of electrical storage devices. In producing electrode materials of electrical storage devices, ordinary polar solvents, such as diethyl carbonate (DCE), dimethyl carbonate (DMC), 1,2-dimethoxyethane (DME), ethylene carbonate (EC), ethylmethyl carbonate (EMC), N-methyl-2-pyrrolidone (NMP), propylene carbonate (PC), and γ-lactone (GBL), are used either individually or as a mixture of two or more thereof. Examples of the solvents used in producing the electrode catalyst of fuel cells include water, methanol, ethanol, isopropyl alcohol, butanol, toluene, xylene, methyl ethyl ketone, and acetone.

In Raman spectrum analysis of the carbon alloy of the invention, the full width at half maximum of the Raman G-band is preferably 60 cm$^{-1}$ or more, more preferably 70 cm$^{-1}$ or more, even more preferably 80 cm$^{-1}$ or more. The carbon alloy showing such a Raman spectrum has increased edges on its surface to exhibit improved catalyst activity and shows equal catalyst activity at any part of it.

(2) Process of Producing N-Containing Carbon Alloy

The process for producing the N-containing carbon alloy of the invention includes the steps of (1) mixing an N-containing crystalline organic compound and an inorganic metal and/or an inorganic metal salt, (2) raising the temperature of the mixture from room temperature to a carbonization temperature in an inert atmosphere at a rate of 1° C./min to 1000° C./min, (3) maintaining the mixture at a temperature of 500° to 1000° C. for 0.1 to 100 hours, and (4) cooling the mixture from the carbonization temperature to room temperature.

The process of the invention is characterized by the step of heating an organic material containing an N-containing crystalline organic compound and an inorganic metal and/or an inorganic metal salt up to a carbonization temperature.

In the step of heating up to the carbonization temperature, the part of the heating operation in which the temperature is being raised is taken as an infusibilization treatment.

The baking temperature for carbonization is not so critical as long as the N-containing crystalline organic compound undergoes pyrolysis and carbonization at the temperature. It is preferably 500° to 1000° C., more preferably 550° to 950° C., even more preferably 600° to 900° C. At reaction temperatures of 500° C. or higher, carbonization proceeds sufficiently to provide a carbon alloy with high catalyst performance. At reaction temperatures of 1000° C. or lower, nitrogen remains in the resulting carbon skeleton to give a desired N to C atomic ratio securing sufficient ORR activity. At reaction temperature exceeding 1000° C., nitrogen hardly remains in the carbon skeleton, tending to result in a reduced atomic N/C and reduced ORR activity. Furthermore, the yield of the carbonization product can considerably decrease.

Carbonization is achieved by maintaining the organic material at 500° to 1000° C. for 0.1 to 100 hours, preferably 1 to 10 hours. Extending the carbonizing time over 10 hours tends to result in a failure to obtain merited effects.

Carbonization is preferably carried out in an inert atmosphere, for example in a stream of inert gas or non-oxidizing gas. The gas flow rate is preferably 0.01 to 2.0 l/min, more preferably 0.05 to 1.0 l/min, even more preferably 0.1 to 0.5 l/min, per 36 mm inner diameter. When the flow rate is less than 0.01 l/min, amorphous carbon by-produced during the baking is not distilled off, causing reduction of the treating temperature for the resulting N-containing carbon alloy. When the flow rate is more than 2.0 l/min, the substrate would vaporize before carbonizing, resulting in a failure to produce an N-containing carbon alloy. To obtain a desired N-containing carbon alloy, the above-described range of gas flow rate is recommended.

By performing the carbonization at high temperatures in a single stage, although the carbon alloy yield is reduced, the resulting carbon alloy has a uniform crystallite size and therefore has metal atoms uniformly distributed therein and maintains a highly active state. As a result, a carbon alloy with excellent oxygen reduction performance is produced.

The step of raising the temperature may be divided in two stages. In this case, during the first stage at relatively low temperatures, thermally instable substances, such as impurities and the solvent, are removed. Providing a second stage of temperature rise allows for continuously performing decomposition and carbonization of the organic material and also causing the decomposition product and the metal to mutually act to stabilize the metal in a more active state, for example, to stabilize Fe ions in a divalent state. As a result, a carbon alloy with excellent oxygen reduction performance is produced.

Furthermore, providing the second stage of temperature rise allows for increasing the treating temperature in the subsequent carbonization step, thereby to provide a carbon alloy with a further regulated carbon structure. As a result, the resulting carbon alloy will have improved conductivity, high oxygen reduction performance, and improved catalyst life.

Raising the temperature in the first stage is to preheat the organic material prior to the second stage while retaining only thermally stable structures. Raising the temperature in the second stage up to the carbonization temperature is to obtain an appropriate carbon alloy. If the temperature exceeds the carbonization temperature at this time, carbonization of the organic material may proceed excessively, which can result in not only a failure to obtain an appropriate carbon alloy but also reduction of yield.

The first stage temperature rise is preferably carried out in an inert atmosphere, such as a nitrogen gas atmosphere or a rare gas atmosphere. The inert gas atmosphere may contain oxygen in such an amount that does not cause combustion of the organic material. The inert gas atmosphere may be either in a closed system or in a semi-closed system with the inert gas flowing therethrough. The semi-closed system is preferred. In the semi-closed system, the gas flow rate is preferably 0.01 to 2.0 l/min, more preferably 0.05 to 1.0 l/min, even more preferably 0.1 to 0.5 l/min, per 36 mm inner diameter.

In the first stage of temperature rise, the organic material is preferably heated up to a temperature ranging from 100° to 500° C., more preferably 150° to 400° C., to provide a uniformly precarbonized material.

The first stage of temperature rise may be achieved either by heating the organic material put in a carbonization chamber from room temperature to a predetermined temperature or by putting the organic material in a carbonization chamber previously set at a predetermined temperature. The former manner is preferred. In the former case, the temperature is preferably elevated at a constant rate. More specifically, the rate of temperature rise is preferably 1° C./min to 1000° C./min, more preferably 1° C. to 500° C./min.

The second stage of temperature rise may be performed by continuously raising the temperature of the system from the temperature of the first stage to the carbonization temperature or once cooling the system to room temperature followed by raising the temperature up to the carbonization temperature. In the case where the first stage of temperature rise is once followed by cooling to room temperature, the cooled precarbonized material may be uniformly ground to powder, and the powder may be molded into a desired shape.

The rate of temperature rise in the second stage is preferably 10° C./min to 1000° C./min, more preferably 10° C./min to 500° C./min. The second stage temperature rise is preferably conducted in an inert atmosphere. In the case of a semi-closed system with a gas flow, the inert gas flow rate is preferably 0.01 to 2.0 l/min, more preferably 0.05 to 1.0 l/min, even more preferably 0.1 to 0.5 l/min, per 36 mm inner diameter. The gas flow rate in the second stage may be the same or different from that in the first stage.

The step of carbonization is preferably carried out in the presence of an activator. Carbonization at high temperatures in the presence of an activator results in the formation of a carbon alloy with developed pores providing an increased surface area. As a result, the metal on the carbon alloy is exposed, thereby, catalyst performance is improved. The surface area of the carbonized product is calculated from a nitrogen gas adsorption.

Examples of useful activators include, but are not limited to, at least one selected from the group consisting of carbon dioxide, water vapor, air, oxygen, alkali metal hydroxides, zinc chloride, phosphoric acid, and mixtures thereof, with carbon dioxide, water vapor, air, oxygen, and mixtures thereof being preferred. A gaseous activator, such as carbon dioxide or water vapor, is used in a concentration of 2 to 80 mol %, preferably 10 to 60 mol %, in the carbonizing atmosphere. A sufficient activating effect is obtained with the activator concentrations of 2 mol % or more. When the activator concentration exceeds 80 mol %, excessive activation can result in considerable reduction of carbonization yield, a failure of efficient production of the carbonization product. A solid activator, such as an alkali metal hydroxide, may be mixed as such with the precarbonized material or dissolved or diluted with a solvent, such as water, to make a solution, with which the carbon alloy precursor is impregnated, or to make a slurry, which is kneaded into the carbon alloy precursor. A liquid activator may be diluted with, e.g., water, and the carbon alloy precursor is impregnated or mixed therewith.

After completion of the carbonization, the carbon alloy may be doped with nitrogen. Nitrogen doping may be performed by liquid phase doping, vapor phase doping, or vapor phase/liquid phase doping. For example, the carbon alloy is heated in an ammonia gas atmosphere as a nitrogen source at 200° to 800° C. for 5 to 180 minutes to introduce nitrogen to the carbon catalyst surface.

After the carbonization, the carbon alloy is cooled to room temperature. After the cooling step, the carbon alloy may be ground by any method known in the art, for example, by means of a ball mill.

(3) Applications

Applications of the N-containing carbon alloy of the invention include, but are not limited to, structural materials, electrode materials, filter materials, and catalyst materials. The N-containing carbon alloy is preferably used as an electrode material of electrical storage devices, such as capacitors and lithium secondary batteries. It is more preferably used as a carbon catalyst of fuel cells, zinc air batteries, and lithium air batteries featuring high ORR activity. The N-containing carbon alloy is applicable to a membrane-electrode assembly (MEA) having a solid polyelectrolyte membrane and catalyst layers adjacent to the membrane. The carbon catalyst of the N-containing carbon alloy may be incorporated into the catalyst layers. The MEA may be used in a fuel cell.

FIG. 1 is a schematic illustration of a fuel cell 10 having a carbon catalyst made of the carbon alloy of the invention. The carbon catalyst is used in the anode and the cathode electrodes.

The fuel cell 10 includes a solid polyelectrolyte 14, a pair of separators 12 and 16, and a pair of electrode catalysts (i.e., an anode catalyst (fuel electrode) 13 and a cathode catalyst (oxidant agent electrode) 15), each pair are facing each other with the solid polyelectrolyte 14 interposed therebetween. The solid polyelectrolyte 14 may be a fluorine-based cation exchange resin membrane typified by a perfluorosulfonic resin membrane. The carbon catalyst of the invention is disposed in contact with each side of the solid polyelectrolyte 14 to constitute a fuel cell 10 having the carbon catalyst as the anode catalyst 13 and the cathode catalyst 15. The carbon catalyst is formed on each side of the solid polyelectrolyte 14, and the anode catalyst 13 and the cathode catalyst 15 are integrated on their electrode reaction layer side with the respective sides of the solid polyelectrolyte 14 by hot pressing to make an MEA.

Conventional fuel cells have a porous sheet as a gas diffusion layer and as a current collector, such as carbon paper, disposed between each electrode catalyst and the adjacent separator. In contrast, the fuel cell 10 of FIG. 1 uses a carbon catalyst having a large specific surface area and good gas diffusion properties as an anode catalyst and a cathode catalyst. By using the above described carbon catalyst as electrode, the carbon catalyst has a function of gas diffusion when a gas diffusion layer is not provided, and there can provide a fuel cell integrated an anode and an cathode electrode catalyst 13 and 15 and a gas diffusion layer. This achieves size and cost reduction of a fuel cell.

The separators 12 and 16 not only support the anode and the cathode catalyst 13 and 15 but serve supply and exhaust of reactant gases, such as fuel gas $H_2$ and oxidizing gas $O_2$. Upon supply of the reactant gases to the anode and the cathode catalysts, a three-phase interface between a vapor phase (reactant gases), a liquid phase (solid polyelectrolyte membrane), and a solid phase (catalyst of the electrodes) is formed along the boundaries between the carbon catalyst of the two electrodes and the solid polyelectrolyte 14. An electrochemical reaction occurs at the three-phase interface to generate direct current power. The electrochemical reactions proceed as follows.

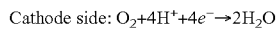

Cathode side: $O_2+4H^++4e^-\rightarrow 2H_2O$

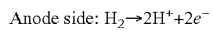

Anode side: $H_2\rightarrow 2H^++2e^-$

The $H^+$ ions generated at the anode move through the solid polyelectrolyte 14 toward the cathode, while electrons ($e^-$) flow through an external load toward the cathode. At the cathode, on the other hand, water forms as a result of reaction between oxygen in the oxidizing gas, the $H^+$ ions coming from the anode side, and $e^-$. Thus, the fuel cell generates a direct electric current from hydrogen and oxygen while forming water.

Figure 2:
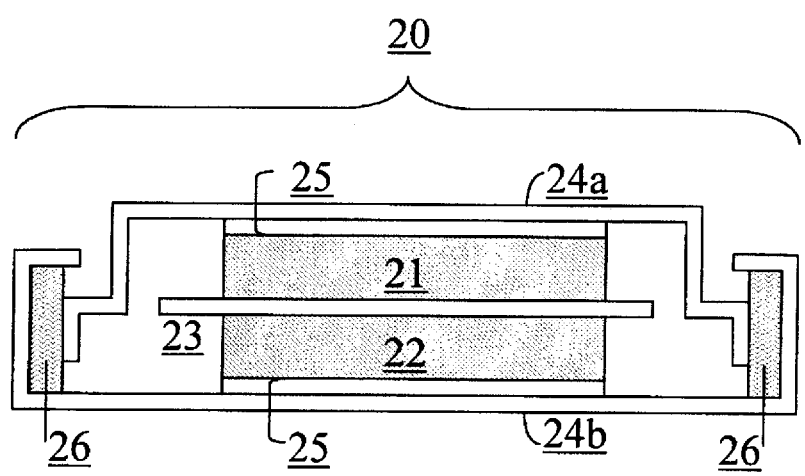
FIG. 2 schematically illustrates an electrical double-layer capacitor having a carbon alloy of the invention.

An electrical storage device having the carbon catalyst having the carbon alloy of the invention as an electrode material will then be described. FIG. 2 schematically illustrates an electrical double-layer capacitor 20 having the carbon catalyst and therefore exhibiting high electrical storage capacity.

The electrical double layer capacitor 20 shown in FIG. 2 includes a pair of polarizable electrodes (a first electrode 21 and a second electrode 22) separated by a separator 23. These capacitor components are sealed in a package composed of a case 24b and a cap 24a. The first electrode 21 and the second electrode 22 are connected to the cap 24a and the case 24b, respectively, via respective current collectors 25. The separator 23 is impregnated with an electrolyte. The cap 24a and the case 24b are swaged to each other via a gasket 26 for electrical insulation therebetween.

The carbon catalyst of the invention is applied to the first electrode 21 and the second electrode 22 to complete an electrical double layer capacitor having the carbon catalyst as electrode material. The carbon catalyst described has a fibrous structure formed of nanoshell carbon particles. The fibers are of nanometer diameter to provide a large specific surface area, thereby providing a large electrode interface where electrical charges are stored in the capacitor. The carbon catalyst is electrochemically inert to the electrolyte and has appropriate electrical conductivity. Therefore, applying the carbon catalyst to the electrodes of capacitors brings about improvement in electrostatic capacity per electrode unit volume.

Similarly to the application to the capacitor, the carbon catalyst of the invention is also applicable as an electrode material formed of a carbon material, such as a negative electrode material of lithium ion secondary batteries. Having a large specific surface area, the carbon catalyst provides a secondary battery with a large storage capacity.

An embodiment of application of the carbon alloy of the invention as a substitute for a noble metal-based (e.g., Pt-based) environmental catalyst will now be described.

An environmental catalyst having a catalyst material containing a noble metal-based (e.g., Pt-based) material or a composite thereof has been used as a catalyst for exhaust gas purification, which is to remove contaminants (chiefly gaseous substances) from contaminated air by decomposition or otherwise. The above described carbon catalyst is useful as a substitute for this type of catalyst. The carbon catalyst has a function to decompose substances to be removed, such as contaminants, because of its ORR catalyzing action. Accordingly, an environmental catalyst is provided at a lower cost by using the carbon catalyst in place of expensive noble metals such as platinum. Furthermore, having a large specific surface area, the carbon catalyst has an increased area capable of decomposing substances to be removed per unit volume, thereby providing an environmental catalyst with excellent decomposing function per unit volume.

The carbon catalyst may also be used as a catalyst carrier on which a noble metal-based (e.g., Pt-based) material used in conventional environmental catalysts is supported either alone or in the form of a composite thereof, thereby establishing an environmental catalyst with improved catalyst activity, such as decomposing activity. The environmental catalyst having the carbon catalyst is useful not only as a catalyst for exhaust gas purification as described but also as a catalyst for purifying water.

The carbon alloy of the invention is also useful as a catalyst for a wide range of chemical reactions, especially as a substitute for platinum catalysts. That is, the above described carbon catalyst is useful as a substitute for general processing catalysts containing a noble metal, e.g., platinum, in chemical industries. Without using expensive noble metals, such as platinum, the carbon alloy provides low-cost catalysts for chemical reaction processes. Having a large specific surface area, the carbon catalyst provides a catalyst for chemical reaction processes with excellent chemical reaction efficiency per unit volume.

Examples of the carbon catalysts for chemical reactions include catalysts for hydrogenation, catalysts for dehydrogenation, catalysts for oxidation, catalysts for polymerization, catalysts for reforming reaction, and catalysts for steam reforming. More specifically, the carbon catalyst is applicable to various chemical reactions with reference to the literature relating to catalysts, such as T. Shirosaki & N. Tohdo, *SHOKUBAI CYOSEI*, Kodansha, 1975.

The present invention will now be illustrated in greater detail with reference to Examples, but it should be understood that the invention is not deemed to be limited thereto.

Example 1

Synthesis of Carbon Material (1C) from PR 254

(1) Infusibilization and Carbonization

Pigment Red 254 (from Tokyo Chemical Industry Co., Ltd.; hereinafter "PR 254") (1.001 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The PR 254 is heated at a rate of temperature rise of 1° C./min from 30° C. to 300° C. and then at 10° C./min from 300° C. to 800° C., maintained at 800° C. for 1 hour, and cooled to room temperature over a period of 3 hours to obtain 0.346 g of a carbon material (1B).

(2) Grinding

The carbon material (1B) is ground in an agate mortar to obtain a carbon material (1C).

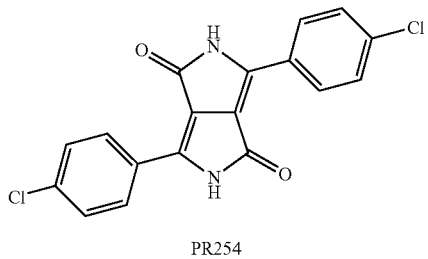 [SMILES: O=C1NC(c2ccc(Cl)cc2)=C2C(=O)NC(c3ccc(Cl)cc3)=C12]

PR254

Molecular formula: $C_{18}H_{10}Cl_2N_2O_2$
Molecular weight: 357.190
Elemental analysis (calcd.): C, 60.53; H, 2.82; Cl, 19.85; N, 7.84; O, 8.96.

Comparative Example 1

Synthesis of Carbon Material (C1C) from PhOH

Infusibilization and Carbonization

Phenol (PhOH) (from Wako Pure Chemical Industries, Ltd.) (1.000 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The PhOH is heated at a rate of temperature rise of 1° C./min from 30° C. to 300° C. and then at 10° C./min from 300° C. to 700° C., maintained at 700° C. for 1 hour, and cooled to room temperature over a period of 3 hours, resulting in a failure to obtain a carbon material.

The same procedures are repeated, except for replacing phenol with phthalonitrile (from Wako Pure Chemical Industries, Ltd.), resulting in the same failure.

Phenol:
Molecular formula: $C_6H_6O$
Molecular weight: 94.11
Elemental analysis (calcd.): C, 76.57; H, 6.43; N, 0.00; O, 17.00.

Phthalonitrile:
Molecular formula: $C_8H_4N_2$
Molecular weight: 128.13
Elemental analysis (calcd.): C, 74.99; H, 3.15; N, 21.86.

Comparative Example 2

Synthesis of Carbon Material (C2C) from MeCN

Infusibilization and Carbonization

Acetonitrile (MeCN) (from Wako Pure Chemical Industries, Ltd.) (1.000 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The MeCN is heated at a rate of temperature rise of 1° C./min from 30° C. to 300° C. and then at 10° C./min from 300° C. to 700° C., maintained at 700° C. for 1 hour, and cooled to room temperature over a period of 3 hours, resulting in a failure to obtain a carbon material.

Acetonitrile:
Molecular formula: $C_2H_3N$
Molecular weight: 41.05
Elemental analysis (calcd.): C, 58.51; H, 7.37; N, 34.12.

Example 2

Synthesis of Carbon Material (2C) from Iron (III) Chloride Hexahydrate/PR 202 Mixture (1) Preparation of Iron (III) Chloride Hexahydrate/PR 202 Mixture To 4.0 g of 2,9-dichloroquinacridone (CINQUASIA Magenta P, from BASF Japan Ltd.) (hereinafter PR 202) is added 1.017 g of iron (III) chloride hexahydrate (from Wako Pure Chemical Industries, Ltd.) and mixed in an agate mortar to prepare an iron (III) chloride hexahydrate/PR 202 mixture (2A).

(2) Infusibilization and Carbonization

The mixture (2A) (1.002 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (2A) is heated at a rate of temperature rise of 1° C./min from 30° C. to 300° C. and then at 10° C./min from 300° C. to 700° C., maintained at 700° C. for 1 hour, and cooled to room temperature over a period of 3 hours to obtain 0.529 g of a carbon material (2B).

(3) Grinding and Acid Cleaning

The carbon material (2B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (2C).

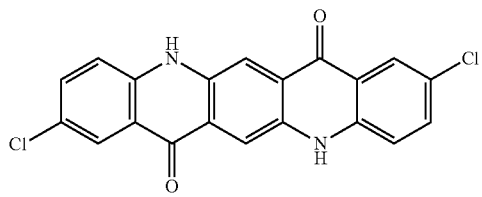

PR202

Molecular formula: $C_{20}H_{10}Cl_2N_2O_2$
Molecular weight: 381.212
Elemental analysis (calcd.): C, 63.01; H, 2.64; Cl, 18.60; N, 7.35; O, 8.39.

Example 3

Synthesis of Carbon Material (3C) from Iron (III) Chloride Hexahydrate/PO 71 Mixture (1) Preparation of Iron (III) Chloride Hexahydrate/PO 71 Mixture To 4.0 g of Pigment Orange 71 (CROMOPHTAL DPP ORANGE TR from BASF Japan Ltd.) (hereinafter PO 71) is added 1.065 g of iron (III) chloride hexahydrate (Wako Pure Chemical Industries, Ltd.) and mixed in an agate mortar to prepare an iron (III) chloride hexahydrate/PO 71 mixture (3A).

(2) Infusibilization and Carbonization

The mixture (3A) (1.006 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (3A) is heated at a rate of temperature rise of 1° C./min from 30° C. to 300° C. and then at 10° C./min from 300° C. to 700° C., maintained at 700° C. for 1 hour, and cooled to room temperature over a period of 30 minutes to obtain 0.390 g of a carbon material (3B).

(3) Grinding and Acid Cleaning

The carbon material (3B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (3C).

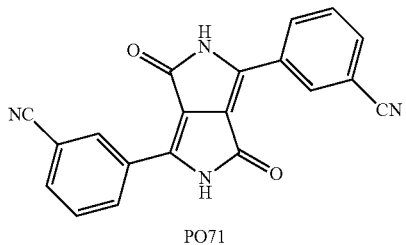 [SMILES: "PO71" ; N#Cc1cccc(C2=C3C(=O)NC(c4cccc(C#N)c4)=C3C(=O)N2)c1]

PO71

Molecular formula: $C_{20}H_{10}N_4O_2$

Molecular weight: 338.319

Elemental analysis (calcd.): C, 71.00; H, 2.98; N, 16.56; O, 9.46.

Example 4

Synthesis of Carbon Material (4C) from Iron (III) Chloride/PR 254 Mixture (1) Preparation of Iron (III) Chloride/PR 254 Mixture To 4.0 g of PR 254 (IRGAPHOR RED BT-CF, from BASF Japan Ltd.) is added 0.606 g of iron (III) chloride (from Wako Pure Chemical Industries, Ltd.) and mixed in an agate mortar to prepare an iron (III) chloride/PR 254 mixture (4A).

(2) Infusibilization and Carbonization

The mixture (4A) (1.003 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (4A) is heated at a rate of temperature rise of 1° C./min from 30° C. to 300° C. and then at 10° C./min from 300° C. to 700° C., maintained at 700° C. for 1 hour, and cooled to room temperature over a period of 3 hours to obtain 0.372 g of a carbon material (4B).

(3) Grinding and Acid Cleaning

The carbon material (4B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (4C).

Example 5

Synthesis of Carbon Material (5C) from Iron (III) Chloride Hexahydrate/PR 254 Mixture (1) Preparation of Iron (III) Chloride Hexahydrate/PR 254 Mixture To 3.00 g of PR 254 (IRGAPHOR RED BT-CF, from BASF Japan Ltd.) is added 1.614 g of iron (III) chloride hexahydrate (from Wako Pure Chemical Industries, Ltd.) and mixed in an agate mortar to prepare an iron (III) chloride hexahydrate/PR 254 mixture (5A).

(2) Infusibilization and Carbonization

The mixture (5A) (1.010 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (5A) is heated at a rate of temperature rise of 1° C./min from 30° C. to 300° C. and then at 10° C./min from 300° C. to 800° C., maintained at 800° C. for 1 hour, and cooled to room temperature over a period of 3 hours to obtain 0.341 g of a carbon material (5B).

(3) Grinding and Acid Cleaning

The carbon material (5B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (5C).

Example 6

Synthesis of Carbon Material (6C) from Iron (III) Chloride Hexahydrate/PR 254 Latent Pigment Mixture (1) Preparation of Iron (III) Chloride Hexahydrate/PR 254 Latent Pigment Mixture Iron (III) chloride hexahydrate (from Wako Pure Chemical Industries, Ltd.) (0.544 g) is added to 4.00 g of a PR 254 latent pigment, which is compound (12) shown in JP 2010-83982A, para. [0072] (hereinafter "PR 254-LP") and mixed in an agate mortar to prepare an iron (III) chloride hexahydrate/PR 254-LP mixture (6A).

(2) Infusibilization and Carbonization

The mixture (6A) (1.013 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (6A) is heated at a rate of temperature rise of 1° C./min from 30° C. to 300° C. and then at 10° C./min from 300° C. to 700° C., maintained at 700° C. for 1 hour, and cooled to room temperature over a period of 30 minutes to obtain 0.259 g of a carbon material (6B).

(3) Grinding and Acid Cleaning

The carbon material (6B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (6C).

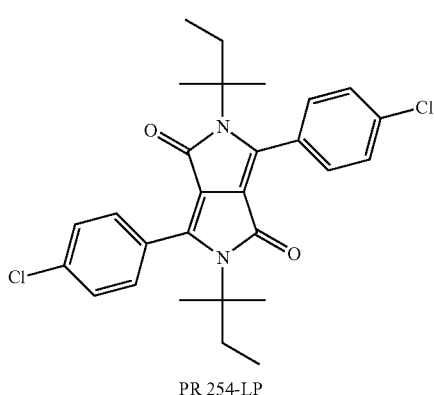 [SMILES: CCC(C)(C)N1C(=O)C2=C(c3ccc(Cl)cc3)N(C(C)(C)CC)C(=O)C2=C1c1ccc(Cl)cc1]

PR 254-LP

Molecular formula: $C_{28}H_{30}Cl_2N_2O_2$
Molecular weight: 497.456
Elemental analysis (calcd.): C, 67.60; H, 6.08; Cl, 14.25; N, 5.63; O, 6.43.

Example 7

Synthesis of Carbon Material (7C) from Iron (III) Chloride Hexahydrate/PR 254 Mixture (1) Preparation of Iron (III) Chloride Hexahydrate/PR 254 Mixture To 3.0 g of PR 254 (IRGAPHOR RED BT-CF, from BASF Japan Ltd.) is added 0.757 g of iron (III) chloride hexahydrate (from Wako Pure Chemical Industries, Ltd.) and mixed in an agate mortar to prepare an iron (III) chloride hexahydrate/PR 254 mixture (7A).

(2) Infusibilization and Carbonization

The mixture (7A) (1.003 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (7A) is heated at a rate of temperature rise of 1° C./min from 30° C. to 300° C. and then at 10° C./min from 300° C. to 700° C., maintained at 700° C. for 1 hour, and cooled to room temperature over a period of 30 minutes to obtain 0.372 g of a carbon material (7B).

(3) Grinding and Acid Cleaning

The carbon material (7B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (7C).

Example 8

Synthesis of Carbon Material (8C) from Iron (II) Chloride Tetrahydrate/PR 254 Mixture (1) Preparation of Iron (II) Chloride Tetrahydrate/PR 254 Mixture To 4.0 g of PR 254 (IRGAPHOR RED BT-CF, from BASF Japan Ltd.) is added 0.742 g of iron (II) chloride tetrahydrate (from Wako Pure Chemical Industries, Ltd.) and mixed in an agate mortar to prepare an iron (II) chloride tetrahydrate/PR 254 mixture (8A).

(2) Infusibilization and Carbonization

The mixture (8A) (1.005 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (8A) is heated at a rate of temperature rise of 1° C./min from 30° C. to 300° C. and then at 10° C./min from 300° C. to 700° C., maintained at 700° C. for 1 hour, and cooled to room temperature over a period of 3 hours to obtain 0.390 g of a carbon material (8B).

(3) Grinding and Acid Cleaning

The carbon material (8B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (8C).

Example 9

Synthesis of Carbon Material (9C) from Iron (III) Chloride Hexahydrate/4,5-Dichlorophthalonitrile (DCP) Mixture (1) Preparation of Iron (III) Chloride Hexahydrate/DCP Mixture To 5.04 g of 4,5-dichlorophthalonitrile (DCP) (from Tokyo Chemical Industry Co., Ltd.) is added 1.15 g of iron (III) chloride hexahydrate (from Wako Pure Chemical Industries, Ltd.) and mixed in an agate mortar to prepare an iron (III) chloride hexahydrate/DCP mixture (9A).

(2) Infusibilization and Carbonization

The mixture (9A) (1.022 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (9A) is heated at a rate of temperature rise of 500° C./min from 30° C. to 700° C., maintained at 700° C. for 1 hour, and cooled to room temperature over a period of 30 minutes to obtain 0.250 g of a carbon material (9B).

(3) Grinding and Acid Cleaning

The carbon material (9B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (9C).

4,5-Dichlorophthalonitrile:
Molecular formula: $C_8H_2N_2Cl_2$
Molecular weight: 197.02
Elemental analysis (calcd.): C, 48.77; H, 1.02; N, 14.22; Cl, 35.99.

Comparative Example 3

Synthesis of Carbon Material (C3C) from Iron Phthalocyanine (Fe-Pc)

(1) Infusibilization and Carbonization

Iron phthalocyanine (Fe-Pc) (from Tokyo Chemical Industry Co., Ltd.) (1.007 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The Fe-Pc is heated at a rate of temperature rise of 1° C./min from 30° C. to 300° C. and then at 10° C./min from 300° C. to 700° C., maintained at 700° C. for 1 hour, and cooled to room temperature over a period of 3 hours to obtain 0.684 g of a carbon material (C3B).

(2) Grinding and Acid Cleaning

The carbon material (C3B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (C3C).

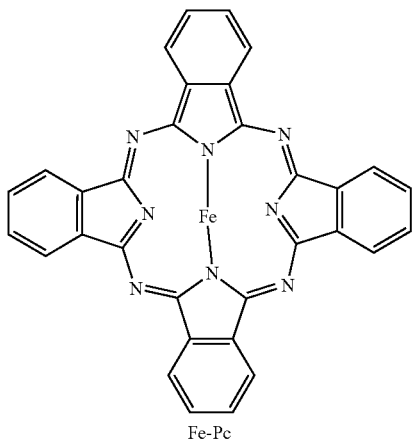

Fe-Pc

Molecular formula: $C_{32}H_{16}FeN_8$
Molecular weight: 568.368
Elemental analysis (calcd.): C, 67.62; H, 2.84; Fe, 9.83; N, 19.71.

Example 10

Synthesis of Carbon Material (10C) from Cobalt (II) Chloride Hexahydrate/4,5-Dichlorophthalonitrile (DCP) Mixture (1) Preparation of Cobalt (II) Chloride Hexahydrate/DCP Mixture To 4.00 g of 4,5-dichlorophthalonitrile (DCP) (from Tokyo Chemical Industry Co., Ltd.) is added 0.805 g of cobalt (II) chloride hexahydrate (from Wako Pure Chemical Industries, Ltd.) and mixed in an agate mortar to prepare a cobalt (II) chloride hexahydrate/DCP mixture (10A).

(2) Infusibilization and Carbonization

The mixture (10A) (1.032 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (10A) is heated at a rate of temperature rise of 5° C./min from 30° C. to 700° C., maintained at 700° C. for 1 hour, and cooled to room temperature over a period of 3 hours to obtain 0.323 g of a carbon material (10B).

(3) Grinding and Acid Cleaning

The carbon material (10B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (10C).

Example 11

Synthesis of Carbon Material (11C) from Cobalt (II) Chloride Hexahydrate/PR 122 Mixture (1) Preparation of Cobalt (II) Chloride Hexahydrate/PR 122 Mixture To 4.0 g of 2,9-dimethylquinacridone (Chromophtal Pink PT, from BASF Japan Ltd.) (hereinafter PR 122) is added 1.016 g of cobalt (II) chloride hexahydrate (from Wako Pure Chemical Industries, Ltd.) and mixed in an agate mortar to prepare a cobalt (II) chloride hexahydrate/PR 122 mixture (11A).

(2) Infusibilization and Carbonization

The mixture (11A) (1.003 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (11A) is heated at a rate of temperature rise of 1° C./min from 30° C. to 300° C. and then at 10° C./min from 300° C. to 700° C., maintained at 700° C. for 1 hour, and cooled to room temperature over a period of 3 hours to obtain 0.670 g of a carbon material (11B).

(3) Grinding and Acid Cleaning

The carbon material (11B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (11C).

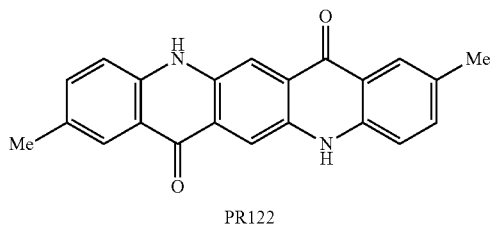 [SMILES: Cc1ccc2[nH]c3cc4c(=O)c5cc(C)ccc5[nH]c4cc3c(=O)c2c1]

PR122

Molecular formula: $C_{22}H_{16}N_2O_2$
Molecular weight: 340.375
Elemental analysis (calcd.): C, 77.63; H, 4.74; N, 8.23; O, 9.40.

Example 12

Synthesis of Carbon Material (12C) from Cobalt (II) Chloride Hexahydrate/4-Hydroxyphthalonitrile (4-HPN) Mixture (1) Preparation of Cobalt (II) Chloride Hexahydrate/4-HPN Mixture To 4.26 g of 4-hydroxyphthalonitrile (4-HPN) (from Tokyo Chemical Industry Co., Ltd.) is added 1.10 g of cobalt (II) chloride hexahydrate (from Wako Pure Chemical Industries, Ltd.) and mixed in an agate mortar to prepare a cobalt (II) chloride hexahydrate/4-HPN mixture (12A).

(2) Infusibilization and Carbonization

The mixture (12A) (1.003 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (12A) is heated at a rate of temperature rise of 500° C./min from 30° C. to 700° C., maintained at 700° C. for 1 hour, and cooled to room temperature over a period of 30 minutes to obtain 0.503 g of a carbon material (12B).

(3) Grinding and Acid Cleaning

The carbon material (12B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (12C).

4-Hydroxyphthalonitrile:
Molecular formula: $C_8H_4N_2O$
Molecular weight: 144.13
Elemental analysis (calcd.): C, 66.67; H, 2.80; N, 19.44; O, 11.10.

Example 13

Synthesis of Carbon Material (13C) from Cobalt (II) Chloride Hexahydrate/4,5-Dihydroxybenzonitrile (4,5-DHBN) Mixture (1) Preparation of Cobalt (II) Chloride Hexahydrate/4,5-DHBN Mixture To 5.0 g of 4,5-dihydroxybenzonitrile (4,5-DHBN) (from Wako Pure Chemical Industries, Ltd.) is added 1.47 g of cobalt (II) chloride hexahydrate (from Wako Pure Chemical Industries, Ltd.) and mixed in an agate mortar to prepare a cobalt (II) chloride hexahydrate/4,5-DHBN mixture (13A).

(2) Infusibilization and Carbonization

The mixture (13A) (1.008 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (13A) is heated at a rate of temperature rise of 500° C./min from 30° C. to 700° C., maintained at 700° C. for 1 hour, and cooled to room temperature over a period of 30 minutes to obtain 0.174 g of a carbon material (13B).

(3) Grinding and Acid Cleaning

The carbon material (13B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (13C).

4,5-Dihydroxybenzonitrile:
Molecular formula: $C_7H_5NO_2$
Molecular weight: 135.12
Elemental analysis (calcd.): C, 62.22; H, 3.73; N, 10.37; O, 23.37.

Example 14

Synthesis of Carbon Material (14C) from Cobalt (II) Chloride Hexahydrate/Phthalonitrile (PN) Mixture (1) Preparation of Cobalt (II) Chloride Hexahydrate/PN Mixture To 4.00 g of phthalonitrile (PN) (from Tokyo Chemical Industry Co., Ltd.) is added 1.24 g of cobalt (II) chloride hexahydrate (from Wako Pure Chemical Industries, Ltd.) and mixed in an agate mortar to prepare a cobalt (II) chloride hexahydrate/PN mixture (14A).

(2) Infusibilization and Carbonization

The mixture (14A) (1.002 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (14A) is heated at a rate of temperature rise of 500° C./min from 30° C. to 700° C., maintained at 700° C. for 1 hour, and cooled to room temperature over a period of 30 minutes to obtain 0.092 g of a carbon material (14B).

(3) Grinding and Acid Cleaning

The carbon material (14B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (14C).

Phthalonitrile:
Molecular formula: $C_8H_4N_2$
Molecular weight: 128.13
Elemental analysis (calcd.): C, 74.99; H, 3.15; N, 21.86.

Example 15

Synthesis of Carbon Material (15C) from Cobalt (II) Chloride Hexahydrate/Vulcan Black (VB)/PN Mixture (1) Preparation of Cobalt (II) Chloride Hexahydrate/VB/PN Mixture To 4.00 g of phthalonitrile (PN) (from Tokyo Chemical Industry Co., Ltd.) is added 1.24 g of cobalt (II) chloride hexahydrate (from Wako Pure Chemical Industries, Ltd.) and mixed in an agate mortar. To 2.00 g of the resulting mixture is further added 2.00 g of Vulcan Black (VB) (XC-72, from Cabot Corporation) to prepare a cobalt (II) chloride hexahydrate/VB/PN mixture (15A).

(2) Infusibilization and Carbonization

The mixture (15A) (1.004 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (15A) is heated at a rate of temperature rise of 500° C./min from 30° C. to 700° C., maintained at 700° C. for 1 hour, and cooled to room temperature over a period of 30 minutes to obtain 0.546 g of a carbon material (15B).

(3) Grinding and Acid Cleaning

The carbon material (15B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (15C).

Example 16

Synthesis of Carbon Material (16C) from Cobalt (II) Chloride Hexahydrate/VB/4-Hydroxyphthalonitrile (4-HPN) Mixture (1) Preparation of Cobalt (II) Chloride Hexahydrate/VB/4-HPN Mixture To 4.26 g of 4-hydroxyphthalonitrile (4-HPN) (from Tokyo Chemical Industry Co., Ltd.) is added 1.10 g of cobalt (II) chloride hexahydrate (from Wako Pure Chemical Industries, Ltd.) and mixed in an agate mortar. To 2.00 g of the resulting mixture is further added 2.00 g of Vulcan Black (VB) (XC-72, from Cabot) to prepare a cobalt (II) chloride hexahydrate/VB/4-HPN mixture (16A).

(2) Infusibilization and Carbonization

The mixture (16A) (1.004 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (16A) is heated at a rate of temperature rise of 10° C./min from 30° C. to 700° C., maintained at 700° C. for 1 hour, and cooled to room temperature over a period of 3 hours to obtain 0.667 g of a carbon material (16B).

(3) Grinding and Acid Cleaning

The carbon material (16B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (16C).

Example 17

Synthesis of Carbon Material (17C) from Cobalt (II) Chloride Hexahydrate/Malononitrile (MN) Mixture (1) Preparation of Cobalt (II) Chloride Hexahydrate/MN Mixture To 5.00 g of malononitrile (MN) (from Wako Pure Chemical Industries, Ltd.) is added 3.00 g of cobalt (II) chloride hexahydrate (from Wako Pure Chemical Industries, Ltd.) and mixed in an agate mortar to prepare a cobalt (II) chloride hexahydrate/MN mixture (17A).

(2) Infusibilization and Carbonization

The mixture (17A) (1.042 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (17A) is heated at a rate of temperature rise of 500° C./min from 30° C. to 700° C., maintained at 700° C. for 1 hour, and cooled to room temperature over a period of 30 minutes to obtain 0.239 g of a carbon material (17B).

(3) Grinding and Acid Cleaning

The carbon material (17B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (17C).

Malononitrile:

Molecular formula: $C_3H_2N_2$

Molecular weight: 66.06

Elemental analysis (calcd.): C, 54.54; H, 3.05; N, 42.41.

Example 18

Synthesis of Carbon Material (18C) from Cobalt (II) Chloride Hexahydrate/2-Cyanobenzamide (2-CBA) Mixture (1) Preparation of Cobalt (II) Chloride Hexahydrate/2-CBA Mixture To 5.13 g of 2-cyanobenzamide (2-CBA) (from Tokyo Chemical Industry Co., Ltd.) is added 1.39 g of cobalt (II) chloride hexahydrate (from Wako Pure Chemical Industries, Ltd.) and mixed in an agate mortar to prepare a cobalt (II) chloride hexahydrate/2-CBA mixture (18A).

(2) Infusibilization and Carbonization

The mixture (18A) (1.023 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (18A) is heated at a rate of temperature rise of 5° C./min from 30° C. to 700° C., maintained at 700° C. for 1 hour, and cooled to room temperature over a period of 30 minutes to obtain 0.260 g of a carbon material (18B).

(3) Grinding and Acid Cleaning

The carbon material (18B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (18C).

2-Cyanobenzamide:

Molecular formula: $C_8H_6N_2O$

Molecular weight: 66.06

Elemental analysis (calcd.): C, 65.75; H, 4.14; N, 19.17; O, 10.95.

Example 19

Synthesis of Carbon Material (19C) from Cobalt (II) Chloride Hexahydrate/3-Cyanobenzamide (3-CBA) Mixture (1) Preparation of Cobalt (II) Chloride Hexahydrate/3-CBA Mixture To 4.00 g of 3-cyanobenzamide (3-CBA) (compound 16a shown in J. Chem. Soc., Perkin Trans. I. 13, 1679 (1994)) is added 1.085 g of cobalt (II) chloride hexahydrate (from Wako Pure Chemical Industries, Ltd.) and mixed in an agate mortar to prepare a cobalt (II) chloride hexahydrate/3-CBA mixture (19A).

(2) Infusibilization and Carbonization

The mixture (19A) (1.003 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (19A) is heated at a rate of temperature rise of 500° C./min from 30° C. to 700° C., maintained at 700° C. for 1 hour, and cooled to room temperature over a period of 30 minutes to obtain 0.075 g of a carbon material (19B).

(3) Grinding and Acid Cleaning

The carbon material (19B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (19C).

3-Cyanobenzamide:

Molecular formula: $C_8H_6N_2O$

Molecular weight: 66.06

Elemental analysis (calcd.): C, 65.75; H, 4.14; N, 19.17; O, 10.95.

Example 20

Synthesis of Carbon Material (20C) from Cobalt (II) Chloride Hexahydrate/4-Chloronitrobenzonitrile (Cl-Ph-CN) Mixture (1) Preparation of Cobalt (II) Chloride Hexahydrate/Cl-Ph-CN Mixture To 4.0 g of 4-chloronitrobenzonitrile (Cl-Ph-CN) (from Tokyo Chemical Industry Co., Ltd.) is added 1.15 g of cobalt (II) chloride hexahydrate (from Wako Pure Chemical Industries, Ltd.) and mixed in an agate mortar to prepare a cobalt (II) chloride hexahydrate/Cl-Ph-CN mixture (20A).

(2) Infusibilization and Carbonization

The mixture (20A) (1.012 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (20A) is heated at a rate of temperature rise of 500° C./min from 30° C. to 700° C., maintained at 700° C. for 1 hour, and cooled to room temperature over a period of 30 minutes to obtain 0.0526 g of a carbon material (20B).

(3) Grinding and Acid Cleaning

The carbon material (20B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (20C).

4-Chloronitrobenzonitrile:
Molecular formula: $C_7H_4Cl$
Molecular weight: 137.57
Elemental analysis (calcd.): C, 61.12; H, 2.93; N, 10.18; Cl, 25.77.

Example 21

Synthesis of Carbon Material (21C) from Cobalt (II) Chloride Hexahydrate/Ketjen Black (KB)/Cl-Ph-CN Mixture (1) Preparation of Cobalt (II) Chloride Hexahydrate/KB/Cl-pH-CN Mixture To 4.0 g of 4-chloronitrobenzonitrile (Cl-Ph-CN) (from Tokyo Chemical Industry Co., Ltd.) is added 1.15 g of cobalt (II) chloride hexahydrate (from Wako Pure Chemical Industries, Ltd.) and mixed in an agate mortar. To 2.0 g of the resulting mixture is further added 2.0 g of Ketjen black (KB) (EC300J, from Lion Corp.) to prepare a cobalt (II) chloride hexahydrate/KB/Cl-Ph-CN mixture (21A).

(2) Infusibilization and Carbonization

The mixture (21A) (0.514 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (21A) is heated at a rate of temperature rise of 500° C./min from 30° C. to 700° C., maintained at 700° C. for 1 hour, and cooled to room temperature over a period of 30 minutes to obtain 0.292 g of a carbon material (21B).

(3) Grinding and Acid Cleaning

The carbon material (21B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (21C).

Example 22

Synthesis of Carbon Material (22C) from Cobalt (II) Chloride Hexahydrate/VB/DCP Mixture (1) Preparation of Cobalt (II) Chloride Hexahydrate/VB/DCP Mixture To 4.00 g of 4,5-dichlorophthalonitrile (DCP) (from Tokyo Chemical Industry Co., Ltd.) is added 0.805 g of cobalt (II) chloride hexahydrate (from Wako Pure Chemical Industries, Ltd.) and mixed in an agate mortar. To 2.0 g of the resulting mixture is further added 2.0 g of Vulcan Black (VB) (XC-72, from Cabot Corporation) to prepare a cobalt (II) chloride hexahydrate/VB/DCP mixture (22A).

(2) Infusibilization and Carbonization

The mixture (22A) (1.003 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (22A) is heated at a rate of temperature rise of 10° C./min from 30° C. to 700° C., maintained at 700° C. for 1 hour, and cooled to room temperature over a period of 30 minutes to obtain 0.632 g of a carbon material (22B).

(3) Grinding and Acid Cleaning

The carbon material (22B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (22C).

Example 23

Synthesis of Carbon Material (23C) from Cobalt Chloride (II) Hexahydrate/PR 254 Latent Pigment (PR 254-LP) Mixture (1) Preparation of Cobalt (II) Chloride Hexahydrate/PR 254-LP Mixture Cobalt (II) chloride hexahydrate (from Wako Pure Chemical Industries, Ltd.) (0.479 g) is added to 4.00 g of PR 254 latent pigment (PR 254-LP), which is compound (12) shown in [chemical formula 24] of para. [0072] and [chemical formula 17] of para. [0158] in JP 2010-83982A, and mixed in an agate mortar to prepare a cobalt (II) chloride hexahydrate/PR 254-LP mixture (23A).

(2) Infusibilization and Carbonization

The mixture (23A) (0.996 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (23A) is heated at a rate of temperature rise of 1° C./min from 30° C. to 300° C. and then at 10° C./min from 300° C. to 700° C., maintained at 700° C. for 1 hour, and cooled to room temperature over a period of 3 hours to obtain 0.270 g of a carbon material (23B).

(3) Grinding and Acid Cleaning

The carbon material (23B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (23C).

Example 24

Synthesis of Carbon Material (24C) from Cobalt (II) Nitrate Hexahydrate/PR 254 Mixture (1) Preparation of Cobalt (II) Nitrate Hexahydrate/PR 254 Mixture To 4.0 g of PR 254 (IRGAPHOR RED BT-CF, from BASF Japan Ltd.) is added 1.09 g of cobalt (II) nitrate hexahydrate (from Wako Pure Chemical Industries, Ltd.) and mixed in an agate mortar to prepare a cobalt (II) nitrate hexahydrate/PR 254 mixture (24A).

(2) Infusibilization and Carbonization

The mixture (24A) (1.004 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (24A) is heated at a rate of temperature rise of 1° C./min from 30° C. to 300° C. and then at 10° C./min from 300° C. to 700° C., maintained at 700° C. for 1 hour, and cooled to room temperature over a period of 3 hours to obtain 0.366 g of a carbon material (24B).

(3) Grinding and Acid Cleaning

The carbon material (24B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (24C).

Example 25

Synthesis of Carbon Material (25C) from Cobalt (II) Chloride Hexahydrate/PR 254 Mixture (1) Preparation of Cobalt (II) Chloride Hexahydrate/PR 254 Mixture To 4.0 g of PR 254 (IRGAPHOR RED BT-CF, from BASF Japan Ltd.) is added 0.888 g of cobalt (II) chloride hexahydrate (from Wako Pure Chemical Industries, Ltd.) and mixed in an agate mortar to prepare a cobalt (II) chloride hexahydrate/PR 254 mixture (25A).

(2) Infusibilization and Carbonization

The mixture (25A) (1.000 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (25A) is heated at a rate of temperature rise of 1° C./min from 30° C. to 300° C. and then at 10° C./min from 300° C. to 800° C., maintained at 800° C. for 1 hour, and cooled to room temperature over a period of 30 minutes to obtain 0.328 g of a carbon material (25B).

(3) Grinding and Acid Cleaning

The carbon material (25B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (25C).

Example 26

Synthesis of Carbon Material (26C) from Cobalt (II) Chloride Hexahydrate/PY 138 Mixture (1) Preparation of Cobalt (II) Chloride Hexahydrate/PY 138 Mixture To 4.0 g of Pigment Yellow 138 (PY 138) (PALIOTOL YELLOW P09 60, from BASF Japan Ltd.) is added 0.457 g of cobalt (II) chloride hexahydrate (from Wako Pure Chemical Industries, Ltd.) and mixed in an agate mortar to prepare a cobalt (II) chloride hexahydrate/PY 138 mixture (26A).

(2) Infusibilization and Carbonization

The mixture (26A) (1.041 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (26A) is heated at a rate of temperature rise of 10° C./min from 30° C. to 700° C., maintained at 700° C. for 1 hour, and cooled to room temperature over a period of 3 hours to obtain 0.559 g of a carbon material (26B).

(3) Grinding and Acid Cleaning

The carbon material (26B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (26C).

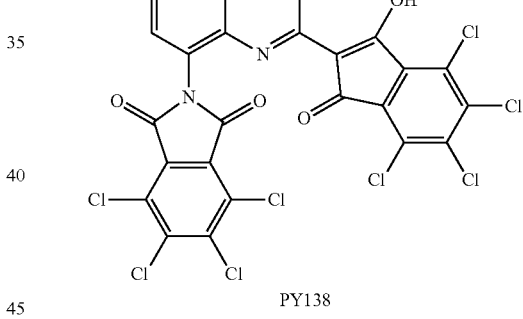

PY138

Molecular formula: $C_{26}H_6Cl_8N_2O_4$
Molecular weight: 693.961
Elemental analysis (calcd.): C, 45.00; H, 0.87; Cl, 40.87; N, 4.04; O, 9.22.

Example 27

Synthesis of Carbon Material (27C) from Cobalt (II) Chloride Hexahydrate/PY 185 Mixture (1) Preparation of Cobalt (II) Chloride Hexahydrate/PY 185 Mixture To 3.0 g of Pigment Yellow 185 (PY 185) (PALIOTOL YELLOW P11 55, from BASF Japan Ltd.) is added 0.701 g of cobalt (II) chloride hexahydrate (from Wako Pure Chemical Industries, Ltd.) and mixed in an agate mortar to prepare a cobalt (II) chloride hexahydrate/PY 185 mixture (27A).

(2) Infusibilization and Carbonization

The mixture (27A) (1.031 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (27A) is heated at a rate of temperature rise of 10° C./min from 30° C. to 700° C., maintained at 700° C. for 1 hour, and cooled to room temperature over a period of 3 hours to obtain 0.362 g of a carbon material (27B).

(3) Grinding and Acid Cleaning

The carbon material (27B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (27C).

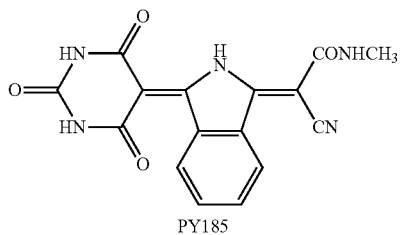

PY185

Molecular formula: $C_{16}H_{11}N_5O_4$

Molecular weight: 337.290

Elemental analysis (calcd.): C, 56.98; H, 3.29; N, 20.76; O, 18.97.

Example 34

Synthesis of Carbon Material (34C) from Cobalt (II) Chloride Hexahydrate/PY 109 Mixture (1) Preparation of Cobalt (II) Chloride Hexahydrate/PY 109 Mixture To 4.00 g of Pigment Yellow 109 (PY 109) (IRGAZIN YELLOW 2GLTE, from BASF Japan Ltd.) is added 0.484 g of cobalt (II) chloride hexahydrate (from Wako Pure Chemical Industries, Ltd.) and mixed in an agate mortar to prepare a cobalt (II) chloride hexahydrate/PY 109 mixture (34A).

(2) Infusibilization and Carbonization

The mixture (34A) (1.007 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (34A) is heated at a rate of temperature rise of 10° C./min from 30° C. to 700° C., maintained at 700° C. for 1 hour, and cooled to room temperature over a period of 3 hours to obtain 0.506 g of a carbon material (34B).

(3) Grinding and Acid Cleaning

The carbon material (34B) is ground in an agate mortar. The powder is washed with concentrated hydrochloride acid three times, each followed by filtration, washed with water, and air dried. The resulting carbon material is dried in vacuo at 110° C. for 1 hour to obtain an acid cleaned carbon material (34C).

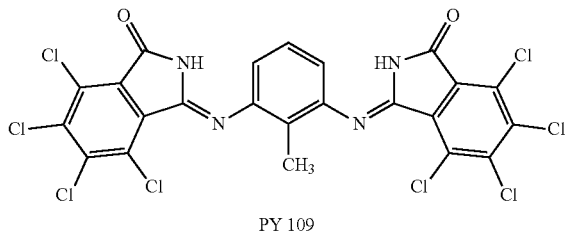 [SMILES: Cc1c(/N=C2\NC(=O)c3c(Cl)c(Cl)c(Cl)c(Cl)c32)cccc1/N=C1\NC(=O)c2c(Cl)c(Cl)c(Cl)c(Cl)c21]

PY 109

Molecular formula: $C_{23}H_8Cl_8N_4O_2$

Molecular weight: 655.959

Elemental analysis (calcd.): C, 42.11; H, 1.23; Cl, 43.24; N, 8.54; O, 4.88.

Example 35

Synthesis of Carbon Material (35C) from Cobalt (II) Chloride Hexahydrate/PY 110 Mixture (1) Preparation of Cobalt (II) Chloride Hexahydrate/PY 110 Mixture To 4.00 g of Pigment Yellow 110 (PY 110) (IRGAZIN YELLOW 2RLT, from BASF Japan Ltd.) is added 0.494 g of cobalt (II) chloride hexahydrate (from Wako Pure Chemical Industries, Ltd.) and mixed in an agate mortar to prepare a cobalt (II) chloride hexahydrate/PY 110 mixture (35A).

(2) Infusibilization and Carbonization

The mixture (35A) (1.031 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (35A) is heated at a rate of temperature rise of 10° C./min from 30° C. to 700° C., maintained at 700° C. for 1 hour, and cooled to room temperature over a period of 3 hours to obtain 0.540 g of a carbon material (35B).

(3) Grinding and Acid Cleaning

The carbon material (35B) is ground in an agate mortar. The powder is washed with concentrated hydrochloride acid three times, each followed by filtration, washed with water, and air dried. The resulting carbon material is dried in vacuo at 110° C. for 1 hour to obtain an acid cleaned carbon material (35C).

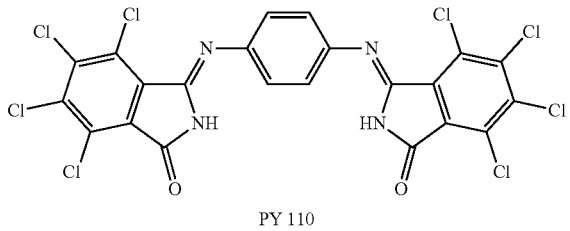 [SMILES: O=C1N/C(=N\c2ccc(/N=C3\NC(=O)c4c(Cl)c(Cl)c(Cl)c(Cl)c43)cc2)c2c(Cl)c(Cl)c(Cl)c(Cl)c21]

PY 110

Molecular formula: $C_{22}H_6Cl_8N_4O_2$

Molecular weight: 641.933

Elemental analysis (calcd.): C, 41.16; H, 0.94; Cl, 44.18; N, 8.73; O, 4.98.

Example 36

Synthesis of Carbon Material (36C) from Cobalt (II) Chloride Hexahydrate/PY 139 Mixture (1) Preparation of cobalt (II) chloride hexahydrate/PY 139 mixture To 4.00 g of Pigment Yellow 139 (PY 139) (Chromophtal Yellow 2RF, from BASF Japan Ltd.) is added 0.864 g of cobalt (II) chloride hexahydrate (from Wako Pure Chemical Industries, Ltd.) and mixed in an agate mortar to prepare a cobalt (II) chloride hexahydrate/PY 139 mixture (36A).

(2) Infusibilization and Carbonization

The mixture (36A) (1.020 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (36A) is heated at a rate of temperature rise of 10° C./min from 30° C. to 700° C., maintained at 700° C. for 1 hour, and cooled to room temperature over a period of 3 hours to obtain 0.331 g of a carbon material (36B).

(3) Grinding and Acid Cleaning

The carbon material (36B) is ground in an agate mortar. The powder is washed with concentrated hydrochloride acid three times, each followed by filtration, washed with water, and air dried. The resulting carbon material is dried in vacuo at 110° C. for 1 hour to obtain an acid cleaned carbon material (36C).

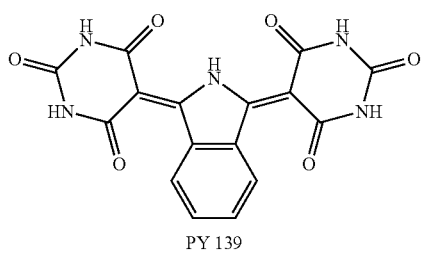 [SMILES: O=C1NC(=O)C(=c2[nH]c(=C3C(=O)NC(=O)NC3=O)c3ccccc23)C(=O)N1]

PY 139

Molecular formula: $C_{16}H_9N_5O_6$
Molecular weight: 367.273
Elemental analysis (calcd.): C, 52.32; H, 2.47; N, 19.07; O, 26.14.

Example 28

Synthesis of Carbon Material (28C) from Cobalt (II) Chloride Hexahydrate/1,2,4,5-Tetracyanobenzene (TCB) Mixture (1) Preparation of Cobalt (II) Chloride Hexahydrate/TCB Mixture To 5.27 g of 1,2,4,5-tetracyanobenzene (TCB) (from Tokyo Chemical Industry Co., Ltd.) is added 1.17 g of cobalt (II) chloride hexahydrate (from Wako Pure Chemical Industries, Ltd.) and mixed in an agate mortar to prepare a cobalt (II) chloride hexahydrate/TCB mixture (28A).

(2) Infusibilization and Carbonization

The mixture (28A) (1.008 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (28A) is heated at a rate of temperature rise of 5 C/min from 30° C. to 700° C., maintained at 700° C. for 1 hour, and cooled to room temperature over a period of 30 minutes to obtain 0.071 g of a carbon material (28B).

(3) Grinding and Acid Cleaning

The carbon material (28B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (28C).

1,2,4,5-Tetracyanobenzene:
Molecular formula: $C_{10}H_2N_4$
Molecular weight: 178.15
Elemental analysis (calcd.): C, 67.42; H, 1.13; N, 31.45.

Example 29

Synthesis of Carbon Material (29C) from Cobalt (II) Chloride Hexahydrate/3,4,5,6-Tetrachlorophthalonitrile (TCPN) Mixture (1) Preparation of Cobalt (II) Chloride Hexahydrate/TCPN Mixture To 5.03 g of 3,4,5,6-tetrachlorophthalonitrile (TCPN) (from Sigma Aldrich Corporation) is added 0.75 g of cobalt (II) chloride hexahydrate (from Wako Pure Chemical Industries, Ltd.) and mixed in an agate mortar to prepare a cobalt (II) chloride hexahydrate/TCPN mixture (29A).

(2) Infusibilization and Carbonization

The mixture (29A) (1.004 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (29A) is heated at a rate of temperature rise of 500° C./min from 30° C. to 700° C., maintained at 700° C. for 1 hour, and cooled to room temperature over a period of 30 minutes to obtain 0.040 g of a carbon material (29B).

(3) Grinding and Acid Cleaning

The carbon material (29B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (29C).

3,4,5,6-Tetrachlorophthalonitrile:
Molecular formula: $C_8N_2Cl_4$
Molecular weight: 265.91
Elemental analysis (calcd.): C, 36.13; H, 0.00; N, 10.53; Cl, 53.33.

Example 30

Synthesis of Carbon Material (30C) from Cobalt (II) Chloride Hexahydrate/7,7,8,8-Tetracyanoquinodimethane (TCNQ) Mixture (1) Preparation of Cobalt (II) Chloride Hexahydrate/TCNQ Mixture To 1.98 g of 7,7,8,8-tetracyanoquinodimethane (TCNQ) (from Tokyo Chemical Industry Co., Ltd.) is added 0.384 g of cobalt (II) chloride hexahydrate (from Wako Pure Chemical Industries, Ltd.) and mixed in an agate mortar to prepare a cobalt (II) chloride hexahydrate/TCNQ mixture (30A).

(2) Infusibilization and Carbonization

The mixture (30A) (1.004 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (30A) is heated at a rate of temperature rise of 5° C./min from 30° C. to 700° C., maintained at 700° C. for 1 hour, and cooled to room temperature over a period of 30 minutes to obtain 0.141 g of a carbon material (30B).

(3) Grinding and Acid Cleaning

The carbon material (30B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (30C).

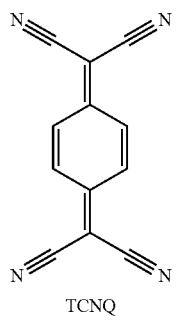 [SMILES: N#CC(C#N)=c1ccc(=C(C#N)C#N)cc1]

TCNQ 7,7,8,8-Tetracyanoquinodimethane:
Molecular formula: $C_{12}H_4N_4$
Molecular weight: 204.187
Elemental analysis (calcd.): C, 70.59; H, 1.97; N, 27.44.

Example 31

Synthesis of Carbon Material (31C) from Cobalt (II) Chloride Hexahydrate/2,3-Dichloro-5,6-Dicyano-1,4-Benzoquinone (DDQ) Mixture (1) Preparation of Cobalt (II) Chloride Hexahydrate/DDQ Mixture To 4.00 g of 2,3-dichloro-5,6-dicyano-1,4-benzoquinone (DDQ) (from Wako Pure Chemical Industries, Ltd.) is added 0.699 g of cobalt (II) chloride hexahydrate (from Wako Pure Chemical Industries, Ltd.) and mixed in an agate mortar to prepare a cobalt (II) chloride hexahydrate/DDQ mixture (31A).

(2) Infusibilization and Carbonization

The mixture (31A) (1.052 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (31A) is heated at a rate of temperature rise of 5° C./min from 30° C. to 700° C., maintained at 700° C. for 1 hour, and cooled to room temperature over a period of 30 minutes to obtain 0.042 g of a carbon material (31B).

(3) Grinding and Acid Cleaning

The carbon material (31B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (31C).

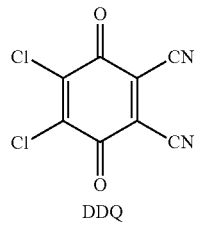

DDQ

Molecular formula: $C_8Cl_2N_2O_2$
Molecular weight: 227.004
Elemental analysis (calcd.): C, 42.33; C, 31.24; N, 12.34; O, 14.10.

Example 32

Synthesis of Carbon Material (32C) from Cobalt (II) Chloride Hexahydrate/4,5-Dichlorophthalamide (DCPA) Mixture (1) Preparation of Cobalt (II) Chloride Hexahydrate/DCPA Mixture To 5.00 g of 4,5-dichlorophthalamide (DCPA) (from Tokyo Chemical Industry Co., Ltd.) is added 0.85 g of cobalt (II) chloride hexahydrate (from Wako Pure Chemical Industries, Ltd.) and mixed in an agate mortar to prepare a cobalt (II) chloride hexahydrate/DCPA mixture (32A).

(2) Infusibilization and Carbonization

The mixture (32A) (1.014 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (32A) is heated at a rate of temperature rise of 5° C./min from 30° C. to 700° C., maintained at 700° C. for 1 hour, and cooled to room temperature over a period of 30 minutes to obtain 0.041 g of a carbon material (32B).

(3) Grinding and Acid Cleaning

The carbon material (32B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (32C).

4,5-Dichlorophthalamide:
Molecular formula: $C_8H_6N_2O_2Cl_2$
Molecular weight: 233.05
Elemental analysis (calcd.): C, 41.23; H, 2.59; N, 12.02; O, 13.73; Cl, 30.42.

Example 33

Synthesis of Carbon Material (33C) from Cobalt (II) Chloride Hexahydrate/2,6-Dicyanopyridine (2,6-DCPy) Mixture (1) Preparation of Cobalt (II) Chloride Hexahydrate/2,6-DCPy Mixture To 5.16 g of 2,6-dicyanopyridine (2,6-DCPy) (from Sigma Aldrich Corporation) is added 1.58 g of cobalt (II) chloride hexahydrate (from Wako Pure Chemical Industries, Ltd.) and mixed in an agate mortar to prepare a cobalt (II) chloride hexahydrate/2,6-DCPy mixture (33A).

(2) Infusibilization and Carbonization

The mixture (33A) (1.027 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The mixture (33A) is heated at a rate of temperature rise of 5° C./min from 30° C. to 700° C., maintained at 700° C. for 1 hour, and cooled to room temperature over a period of 30 minutes to obtain 0.140 g of a carbon material (33B).

(3) Grinding and Acid Cleaning

The carbon material (33B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (33C).

2,6-Dicyanopyridine:
Molecular formula: $C_7H_3N_3$
Molecular weight: 129.12
Elemental analysis (calcd.): C, 65.11; H, 2.34; N, 32.54.

Comparative Example 4

Synthesis of Carbon Material (C4C) from Cobalt Phthalocyanine (Co-Pc)

(1) Infusibilization and Carbonization

Cobalt phthalocyanine (Co-Pc) (from Sigma Aldrich Corporation) (1.005 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The Fe-Pc is heated at a rate of temperature rise of 1° C./min from 30° C. to 300° C. and then at 10° C./min from 300° C. to 700° C., maintained at 700° C. for 1 hour, and cooled to room temperature over a period of 3 hours to obtain 0.789 g of a carbon material (C4B).

(2) Grinding and Acid Cleaning

The carbon material (C4B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (C4C).

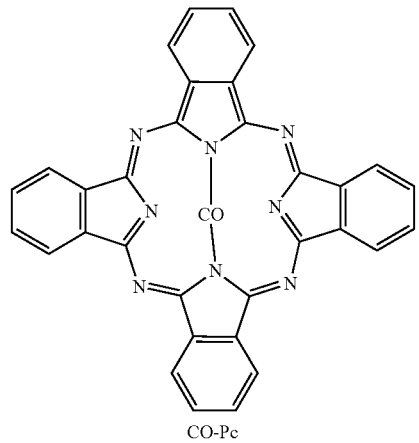

CO-Pc

Molecular formula: $C_{32}H_{16}CoN_8$
Molecular weight: 571.456
Elemental analysis (calcd.): C, 67.26; H, 2.82; Co, 10.31; N, 19.61.

Comparative Example 5

Synthesis of Carbon Material (C5C) from Co-PQ (1) Synthesis of polyquinolinol (PQ)

In a 100 ml recovery flask are put 10 g of 8-quinolinol, 10 g of formaldehyde, and 1 g of oxalic acid dihydrate and refluxed at 100° C. overnight. To the mixture is added 5.5 ml of 1M HCl, followed by refluxing under the same conditions overnight. The resulting solid is collected by filtration by suction, washed three times with distilled water, and dried in vacuo overnight to yield PQ.

(2) Preparation of Cobalt Polyquinolinol Complex (Co-PQ)

In 100 ml of N,N-dimethylformamide is dissolved 3.3 g of PQ, and a solution of 0.9 g of cobalt (II) chloride in 50 ml of dimethylacetamide (DMAc) is added thereto. After allowing the mixed solution to stand still overnight, the solution is concentrated using an evaporator (90° C.) and added dropwise to 3000 ml of water. The precipitate thus formed is collected by filtration, reprecipitated from DMAc, and collected by filtration to obtain a cobalt polyquinolinol complex (Co-PQ). The composition of Co-PQ is found to be $Co(PQ)_3$.

(3) Infusibilization and Carbonization

Co-PQ (1.001 g) is weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The Co-PQ is heated at a rate of temperature rise of 1° C./min from 30° C. to 300° C. and then at 10° C./min from 300° C. to 700° C., maintained at 700° C. for 1 hour, and cooled to room temperature over a period of 3 hours to obtain 0.522 g of a carbon material (C5B).

(4) Grinding and Acid Cleaning

The carbon material (C5B) is ground in an agate mortar. The powder is washed with concentrated hydrochloride acid three times, each followed by filtration, washed with water, and air dried. The resulting carbon material is dried in vacuo at 60° C. overnight to obtain an acid cleaned carbon material (C5C).

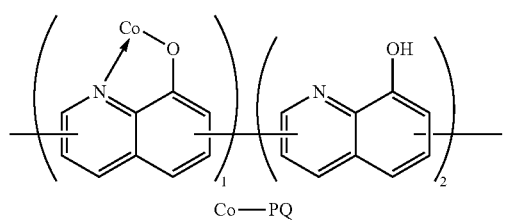

Co—PQ

Molecular formula: $(C_{10}H_7NO)_n$
Molecular weight (Mw): 14,000
Elemental analysis (calcd.): C, 76.42; H, 4.49; N, 8.91; O, 10.18.
Cobalt polyquinolinol complex (Co-PQ):
Molecular formula: $(C_{30}H_{21}N_3O_3Co)_n$
Formula weight: 530.44
Elemental analysis (calcd.): C, 67.9; H, 4.43; N, 7.92; O, 9.05; Co, 11.10.

Comparative Example 6

Synthesis of Carbon Material (C6C) from Cobalt (II) Chloride Hexahydrate/Acetonitrile (MeCN) Mixture Preparation of Cobalt (II) Chloride Hexahydrate/MeCN Mixture, Infusibilization, and Carbonization Acetonitrile (MeCN) (0.5 g) (from Wako Pure Chemical Industries, Ltd.) and 0.50 g of cobalt (II) chloride hexahydrate are weighed into a quartz boat. The quartz boat is placed in the middle of a quartz tube (outer diameter: 4.0 cm; inner diameter: 3.6 cm) inserted in a tubular furnace. Nitrogen is made to flow at a rate of 300 ml/min for 30 minutes at room temperature. The cobalt (II) chloride hexahydrate/MeCN mixture is heated at a rate of temperature rise of 10° C./min from 30° C. to 700° C., maintained at 700° C. for 1 hour, and cooled to room temperature over a period of 3 hours. The resulting purple residue (C6B) is washed with concentrated hydrochloride acid three times, each followed by filtration, washed with water, and air dried. Nothing remained on the filter paper, meaning a failure to obtain a carbon material.

Evaluation of Physical Properties of Organic Material:

Heat resistance of the organic materials used in Examples 1 to 33 and Comparative Examples 3 to 5 is evaluated by determining a percent mass loss (ΔTG) at 400° C. relative to the mass at room temperature in TG-DTA analysis at a rate of temperature rise of 10° C./min from 30° C. to 1000° C. in a nitrogen atmosphere. TG-DTA analysis is performed on EXSTAR 6000 series TG/DTA 6200 from SII Nanotechnology Corporation. The results obtained are shown in Tables 1 to 3.

Making Carbon Alloy-Coated Electrode:

Each of the carbon alloy materials obtained in Examples 1 to 33 and Comparative Examples 1 to 6 weighing 10 mg is mixed with 110 mg of a Nafion solution (5% alcoholic aqueous solution) as a binder, 2.4 ml of water and 1.6 ml of 1-propanol as solvents and dispersed in an ultrasonic homogenizer (horn tip diameter: 7 mm) (from Nippon Seiki Co., Ltd.) for 30 minutes. A 4 μl aliquot of the dispersion is applied to a rotating disk electrode and dried at room temperature to make a carbon alloy-coated electrode. The characteristics of the resulting carbon alloy-coated electrode are evaluated as follows. The results obtained are shown in Tables 1 to 3.

Determination of ORR activity:

Automatic polarization system HZ-3000 (from Hokuto Denko Corp.) equipped with a disk electrode rotator HR-201 (from Hokuto Denko) is used for linear sweep voltammetry (LSV) according to the following procedures. The carbon alloy-coated electrode is set as a working electrode. A platinum electrode and a saturated calomel electrode (SCE) are used as a counter electrode and a reference electrode, respectively.

Procedures:

(a) The carbon alloy-coated electrode is cleaned by cyclic voltammetry in a 0.1M sulfuric acid aqueous solution at 20° C. through which argon had been bubbled for at least 30 minutes at a sweep rate of 50 mV/s with a sweep potential ranging from 0.946 to −0.204 V (vs. SCE) for 10 cycles.

(b) To obtain blank data, LSV is carried out in a 0.1 M sulfuric acid aqueous solution at 20° C. through which argon had been bubbled for at least 30 minutes at a sweep rate of 5 mV/s with a sweep potential ranging from 0.746 to −0.204 V (vs. SCE) and at an electrode rotation speed of 1500 rpm.

(c) For ORR activity determination, LSV is performed in a 0.5 M sulfuric acid aqueous solution through which oxygen had been bubbled for at least 30 minutes at a sweep rate of 5 mV/s with a sweep potential ranging from 0.746 to −0.204 V (vs. SCE) and at an electrode rotation speed of 1500 rpm.

Figure 3:
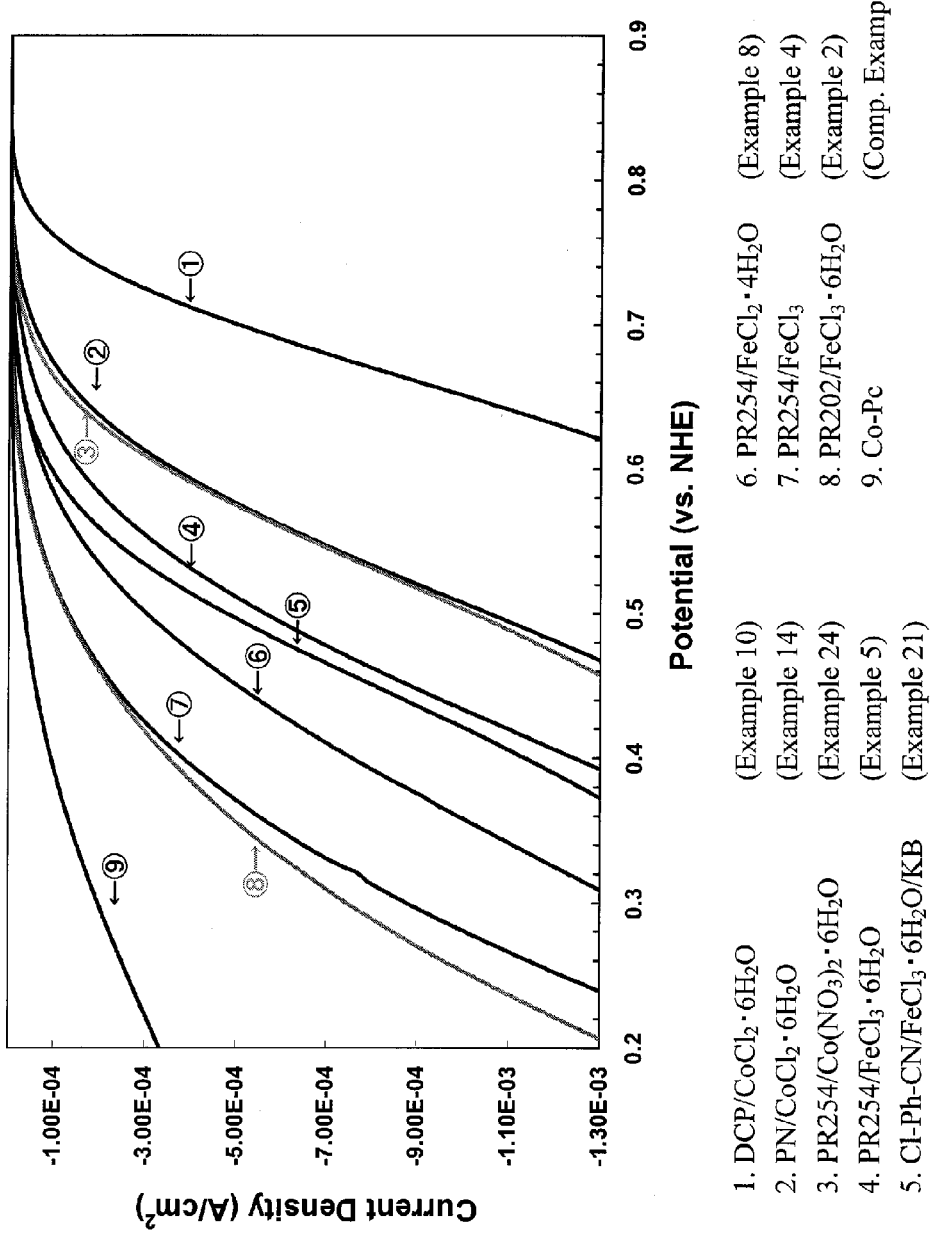
FIG. 3 graphically represents voltage-current density curves of the fuel cells of Examples 2, 4, 5, 8, 10, 14, 21, and 24 and Comparative Example 4.

(d) The blank data obtained in (b) above is subtracted from the data of (c) to obtain a true oxygen reduction current. The current density at the voltage of 0.5 V (vs. NHE) is obtained from the resulting voltammogram (voltage-current density curve, see FIG. 3), which is taken as an ORR activity value.

BET Specific surface area:

The sample is dried at 200° C. in vacuo for 3 hours using a pretreatment instrument BELPREP-flow (from Bel Japan, Inc.). The specific surface area measurement is performed using an automatic specific surface area/pore distribution measurement instrument BELSOPR-mini II (from Bel Japan, Inc.) under simplified measuring conditions. Specific surface area analysis is carried out by the BET method using the attached analysis program.

Raman Microscopy:

A dispersive Raman system T6400 (from HORIBA Jobin Yvon Inc.) equipped with an Ar ion laser (514.5 nm excitation) and a 100× power objective (1 μm resolution) is used to obtain a Raman spectrum. The resulting Raman spectrum is subjected to wave separation to be divided into D-band (C(sp3)) and G-band (C(sp2)) appearing at about 1320 cm$^{-1}$ and about 1600 cm$^{-1}$, respectively. The full width at half maximum of the D-band (ΔD) is obtained, which is taken as a measure of turbostraticity.

TABLE 1

| | Organic Material Composition | | | ΔTG at 400° C. (%) | ORR Activity A (μA/cm$^2$) | BET Specific Surface Area (m$^2$/g) | Turbo-straticity ΔD (cm$^{-1}$) |
|---|---|---|---|---|---|---|---|
| | A | B | C | | | | |
| Example 1 | PR 254 | | | −1 | −100 | 232 | 138 |
| Comp. Example 1 | PhOH | | | −100 | — | — | — |
| Comp. Example 2 | MeCN | | | −100 | — | — | — |

TABLE 2

| | Organic Material Composition | | | ΔTG at 400° C. (%) | ORR Activity A (μA/cm²) | BET Specific Surface Area (m²/g) | Turbostraticity ΔD (cm⁻¹) |
|---|---|---|---|---|---|---|---|
| | A | B | C | | | | |
| Example 2 | PR 202 | $FeCl_3 \cdot 6H_2O$ | | −25 | −128 | 269 | 110 |
| Example 3 | PO 71 | $FeCl_3 \cdot 6H_2O$ | | −25 | −151 | 312 | — |
| Example 4 | PR 254 | $FeCl_3$ | | −10 | −131 | 166 | 80 |
| Example 5 | PR 254 | $FeCl_3 \cdot 6H_2O$ | | −27 | −563 | 325 | — |
| Example 6 | PR 254-LP | $FeCl_3 \cdot 6H_2O$ | | −39 | −730 | 321 | — |
| Example 7 | PR 254 | $FeCl_3 \cdot 6H_2O$ | | −20 | −250 | 374 | 83 |
| Example 8 | PR 254 | $FeCl_2 \cdot 4H_2O$ | | −8 | −302 | 394 | 103 |
| Example 9 | DCP | $FeCl_3 \cdot 6H_2O$ | | −56 | −418 | 163 | — |
| Comp. Example 3 | Fe-Pc | | | −6 | −70 | 137 | 58 |

TABLE 3

| | Organic Material Composition | | | ΔTG at 400° C. (%) | ORR Activity A (μA/cm²) | BET Specific Surface Area (m²/g) | Turbostraticity ΔD (cm⁻¹) |
|---|---|---|---|---|---|---|---|
| | A | B | C | | | | |
| Example 10 | DCP | $CoCl_2 \cdot 6H_2O$ | | −70 | −2094 | 361 | 84 |
| Example 11 | PR 122 | $CoCl_2 \cdot 6H_2O$ | | −11 | −105 | 91 | 101 |
| Example 12 | 4-HPN | $CoCl_2 \cdot 6H_2O$ | | −32 | −119 | 89 | — |
| Example 13 | 4,5-DHBN | $CoCl_2 \cdot 6H_2O$ | | −54 | −244 | 244 | — |
| Example 14 | PN | $CoCl_2 \cdot 6H_2O$ | | −61 | −1055 | 100 | — |
| Example 15 | PN | $CoCl_2 \cdot 6H_2O$ | VB | −45 | −448 | 116 | — |
| Example 16 | 4-HPN | $CoCl_2 \cdot 6H_2O$ | VB | −42 | −795 | 132 | — |
| Example 17 | MN | $CoCl_2 \cdot 6H_2O$ | | −55 | −774 | 199 | — |
| Example 18 | 2-CBA | $CoCl_2 \cdot 6H_2O$ | | −67 | −789 | 229 | — |
| Example 19 | 3-CBA | $CoCl_2 \cdot 6H_2O$ | | −79 | −766 | 108 | — |
| Example 20 | Cl—Ph—CN | $CoCl_2 \cdot 6H_2O$ | | −87 | −500 | 29 | — |
| Example 21 | Cl—Ph—CN | $CoCl_2 \cdot 6H_2O$ | KB | −42 | −478 | 662 | — |
| Example 22 | DCP | $CoCl_2 \cdot 6H_2O$ | VB | −48 | −680 | 112 | — |
| Example 23 | PR 254-LP | $CoCl_2 \cdot 6H_2O$ | | −41 | −967 | 387 | — |
| Example 24 | PR 254 | $Co(NO_3)_2 \cdot 6H_2O$ | | −23 | −1022 | 376 | 127 |
| Example 25 | PR 245 | $CoCl_2 \cdot 6H_2O$ | | −10 | −1067 | 319 | 145 |
| Example 26 | PY 138 | $CoCl_2 \cdot 6H_2O$ | | −7 | −583 | 180 | — |
| Example 27 | PY 185 | $CoCl_2 \cdot 6H_2O$ | | −26 | −1122 | 484 | — |
| Example 34 | PY 109 | $CoCl_2 \cdot 6H_2O$ | | −6 | −475 | 77 | — |
| Example 35 | PY 110 | $CoCl_2 \cdot 6H_2O$ | | −6 | −579 | 111 | — |
| Example 36 | PY 139 | $CoCl_2 \cdot 6H_2O$ | | −22 | −1410 | 234 | — |
| Example 28 | TCB | $CoCl_2 \cdot 6H_2O$ | | −83 | −1693 | 63 | — |
| Example 29 | TCPN | $CoCl_2 \cdot 6H_2O$ | | −90 | −1369 | 238 | — |
| Example 30 | TCNQ | $CoCl_2 \cdot 6H_2O$ | | −89 | −1131 | 47 | — |
| Example 31 | DDQ | $CoCl_2 \cdot 6H_2O$ | | −92 | −1359 | 86 | — |
| Example 32 | DCPA | $CoCl_2 \cdot 6H_2O$ | | −85 | −2060 | 308 | — |
| Example 33 | 2,6-DCPy | $CoCl_2 \cdot 6H_2O$ | | −84 | −1339 | 165 | — |
| Comp. Example 4 | Co-Pc | | | −2 | −35 | 134 | — |
| Comp. Example 5 | C—PQ | | | −20 | −32 | 134 | 40 |
| Comp. Example 6 | MeCN | $CoCl_2 \cdot 6H_2O$ | | — | — | — | — |

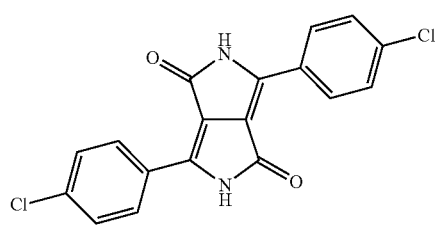

PR254

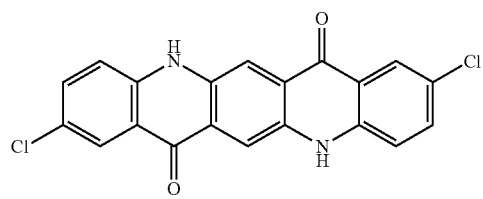

PR202

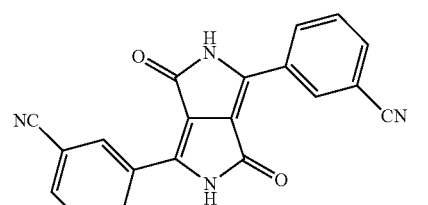
PO71
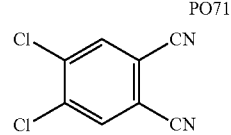
DCP
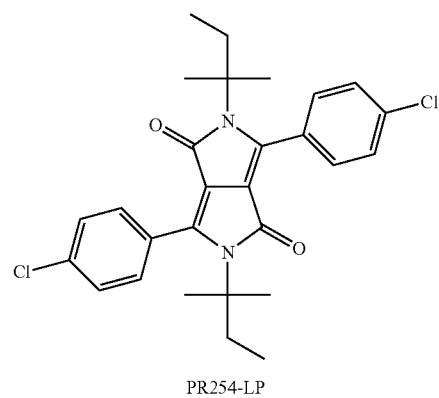
PR254-LP
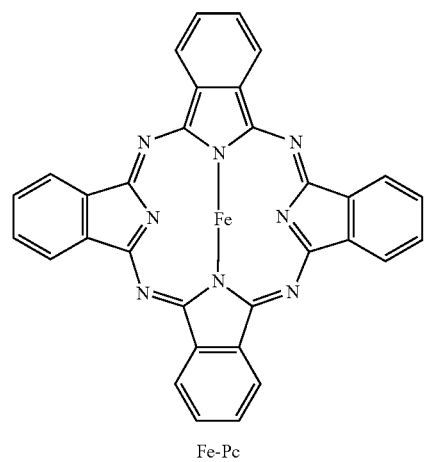
Fe-Pc
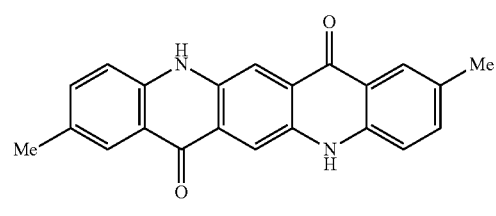
PR122
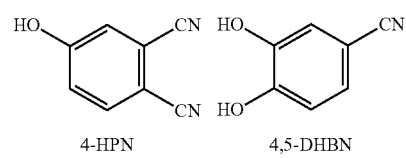
4-HPN    4,5-DHBN
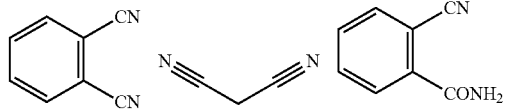
PN    MN    2-CBA
3-CBA    Cl—Ph—CN
PY138
TCB    TCPN
TCNQ    DDQ
2,6-DCPy
PY185
PY109

-continued

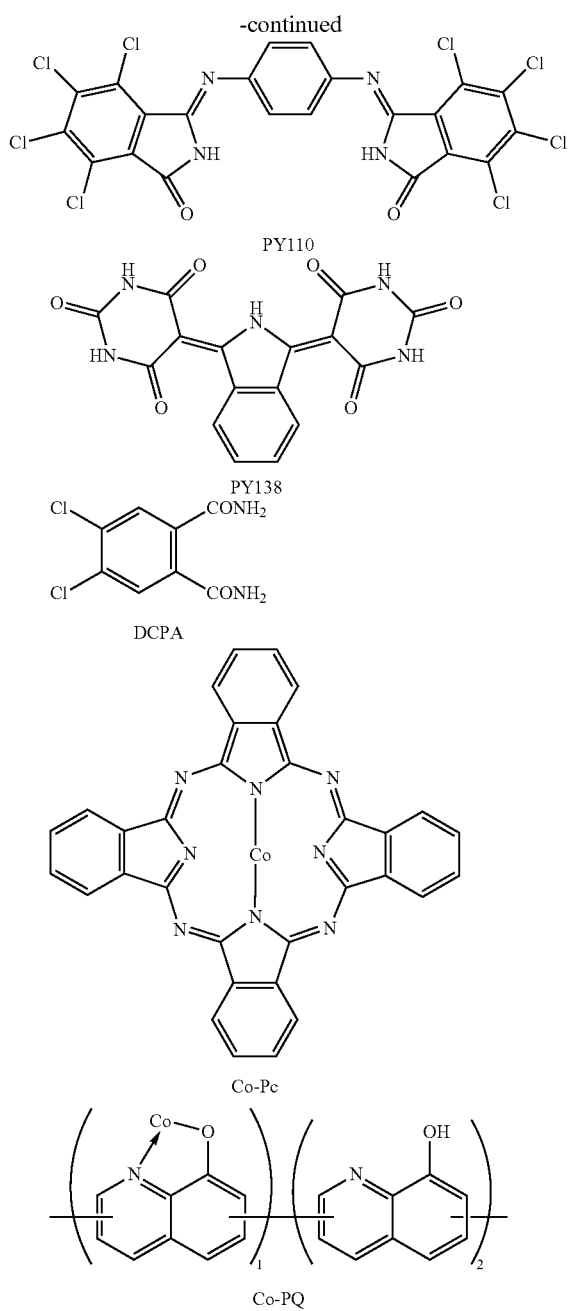

PY110

PY138

DCPA

Co-Pc

Co-PQ

What is claimed is:

1. A process for producing a nitrogen-containing carbon alloy, comprising:
 mixing a nitrogen-containing crystalline organic compound having a molecular weight of 60 to 2000 and at least one of an inorganic metal and an inorganic metal salt;
 raising a temperature of the mixture from room temperature to a carbonization temperature of the mixture in an inert atmosphere at a rate of 1° C./min to 1000° C./min;
 maintaining the mixture at a temperature of 500° to 1000° C. for 0.1 to 100 hours to achieve carbonization; and
 cooling the carbonized mixture from the carbonization temperature to room temperature,
 wherein the nitrogen-containing crystalline organic compound is:

(i) a compound represented by formula (1) or a tautomer thereof, or a salt or a hydrate of the compound of formula (1) or tautomer,

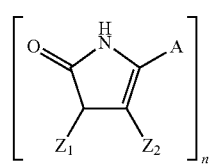 (1)

wherein,
 each of $Z_1$ and $Z_2$ independently represents a hydrogen atom, an aliphatic group, an aryl group, a heterocyclic group, an acyl group, a hydroxyl group, an aliphatic oxycarbonyl group, a carbamoyl group (—$CONH_2$), or a sulfonyl group,
 n represents an integer of 1 to 3,
 when n=2, the compound is a dimer formed via $Z_1$ and $Z_2$, and
 when n=3, the compound is a trimer formed via a benzene or triazine ring comprising $Z_1$ and $Z_2$, and
 A represents any one of formulae (A-1) to (A-39),

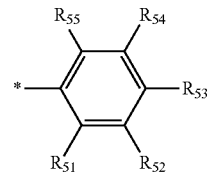 (A-1)

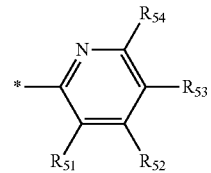 (A-2)

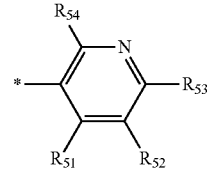 (A-3)

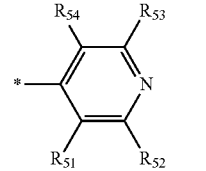 (A-4)

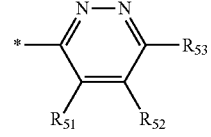 (A-5)

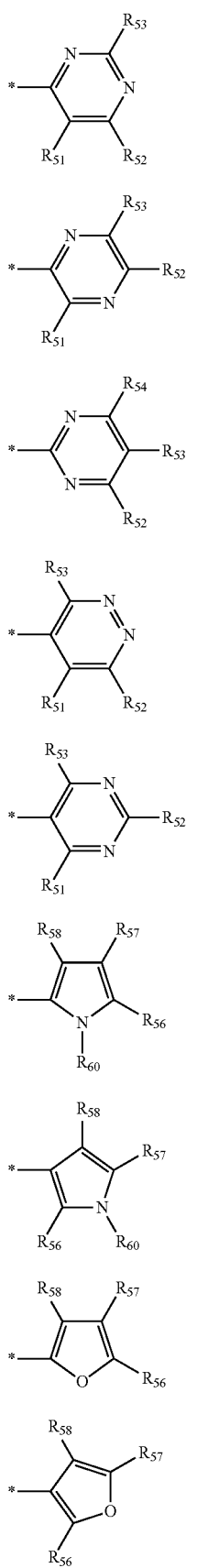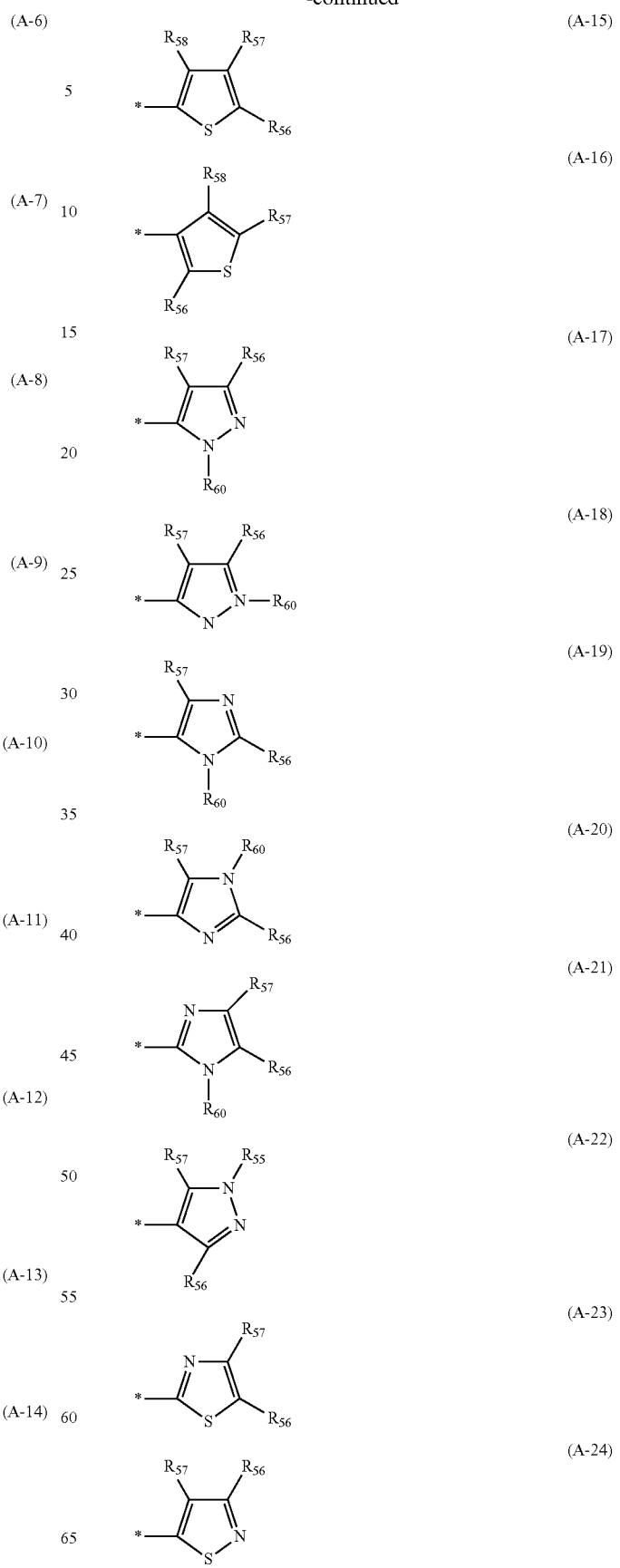

-continued

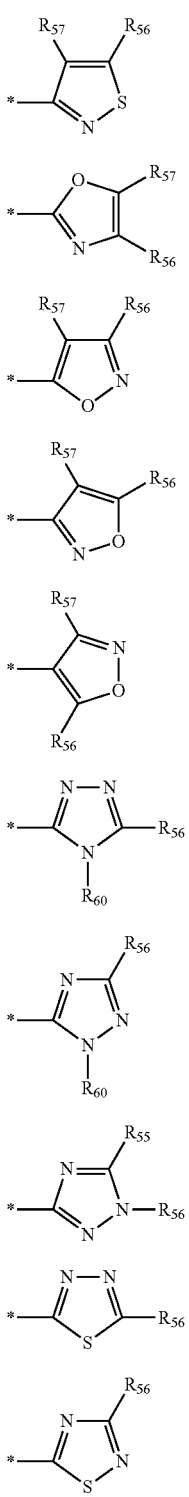

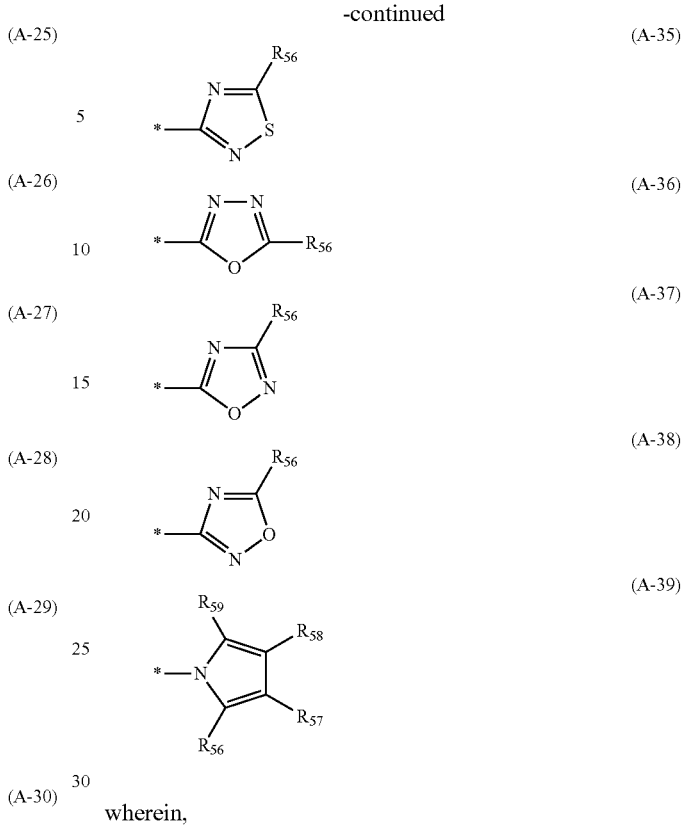

wherein,
each of $R_{51}$-$R_{60}$ independently represents hydrogen or a substituent,
adjacent substituents may be connected to each other to form a 5-membered or 6-membered ring, and
the asterisk * indicates the position of bonding to the pyrrolidone structure of formula (1); or
(ii) a compound represented by formula (11) or a tautomer thereof, or a salt or a hydrate of the compound of the formula (11) or tautomer, $$N \equiv\!\!\!\equiv A \tag{11}$$

wherein,
A represents any one of the formulae (A-1) to (A-39),
each of $R_{51}$-$R_{60}$ independently represents hydrogen or a substituent,
adjacent substituents may be connected to each other to form a 5-membered or 6-membered ring, and
the asterisk * indicates the position of bonding to the nitrile structure of formula (11).

2. The method of claim 1, wherein the nitrogen-containing crystalline organic compound excludes a nitrogen-containing metal complex.

* * * * *